(12) United States Patent
Sakai et al.

(10) Patent No.: US 7,848,563 B2
(45) Date of Patent: Dec. 7, 2010

(54) METHOD AND APPARATUS FOR INSPECTING A DEFECT OF A PATTERN

(75) Inventors: Kaoru Sakai, Yokohama (JP); Shunji Maeda, Yokohama (JP); Hisae Shibuya, Chigasaki (JP); Hidetoshi Nishiyama, Fujisawa (JP)

(73) Assignee: Hitachi High-Technologies Corporation, Tokyo (JP)

( * ) Notice: Subject to any disclaimer, the term of this patent is extended or adjusted under 35 U.S.C. 154(b) by 1099 days.

(21) Appl. No.: 11/328,231

(22) Filed: Jan. 10, 2006

(65) Prior Publication Data

US 2006/0159330 A1 Jul. 20, 2006

(30) Foreign Application Priority Data

Jan. 14, 2005 (JP) ............................. 2005-007011
Jun. 20, 2005 (JP) ............................. 2005-178715

(51) Int. Cl.
G06K 9/62 (2006.01)
G06K 9/36 (2006.01)

(52) U.S. Cl. .................... 382/149; 382/224; 382/284; 382/144

(58) Field of Classification Search ................ 382/141, 382/144, 145, 147, 149, 150, 224, 284; 348/86, 348/87, 92

See application file for complete search history.

(56) References Cited

U.S. PATENT DOCUMENTS 6,678,404 B1 * 1/2004 Lee et al. ..................... 382/155
6,762,831 B2 * 7/2004 Shibata et al. ............ 356/237.2
7,440,607 B1 * 10/2008 Lin et al. ..................... 382/149
2001/0048761 A1 * 12/2001 Hamamatsu et al. ........ 382/149
2005/0196033 A1 9/2005 Hamamatsu et al.

FOREIGN PATENT DOCUMENTS

JP 05-264467 10/1993
JP 2001-250852 9/2001

OTHER PUBLICATIONS

Japanese Office Action dated Jan. 12, 2009.

* cited by examiner

*Primary Examiner*—Jon Chang
(74) *Attorney, Agent, or Firm*—Antonelli, Terry, Stout & Kraus, LLP.

(57) ABSTRACT

In a pattern inspection apparatus, influences of pattern brightness variations that is caused in association with, for example, a film thickness difference or a pattern width variation can be reduced, high sensitive pattern inspection can be implemented, and a variety of defects can be detected. Thereby, the pattern inspection apparatus adaptable to a broad range of processing steps is realized. In order to realize this, the pattern inspection apparatus of the present invention performs comparison between images of regions corresponding to patterns formed to be same patterns, thereby determining mismatch portions across the images to be defects. The apparatus includes multiple sensors capable of synchronously acquiring images of shiftable multiple detection systems different from one another, and an image comparator section corresponding thereto. In addition, the apparatus includes means of detecting a statistical offset value from the feature amount to be a defect, thereby enabling the defect to be properly detected even when a brightness difference is occurring in association with film a thickness difference in a wafer.

14 Claims, 18 Drawing Sheets

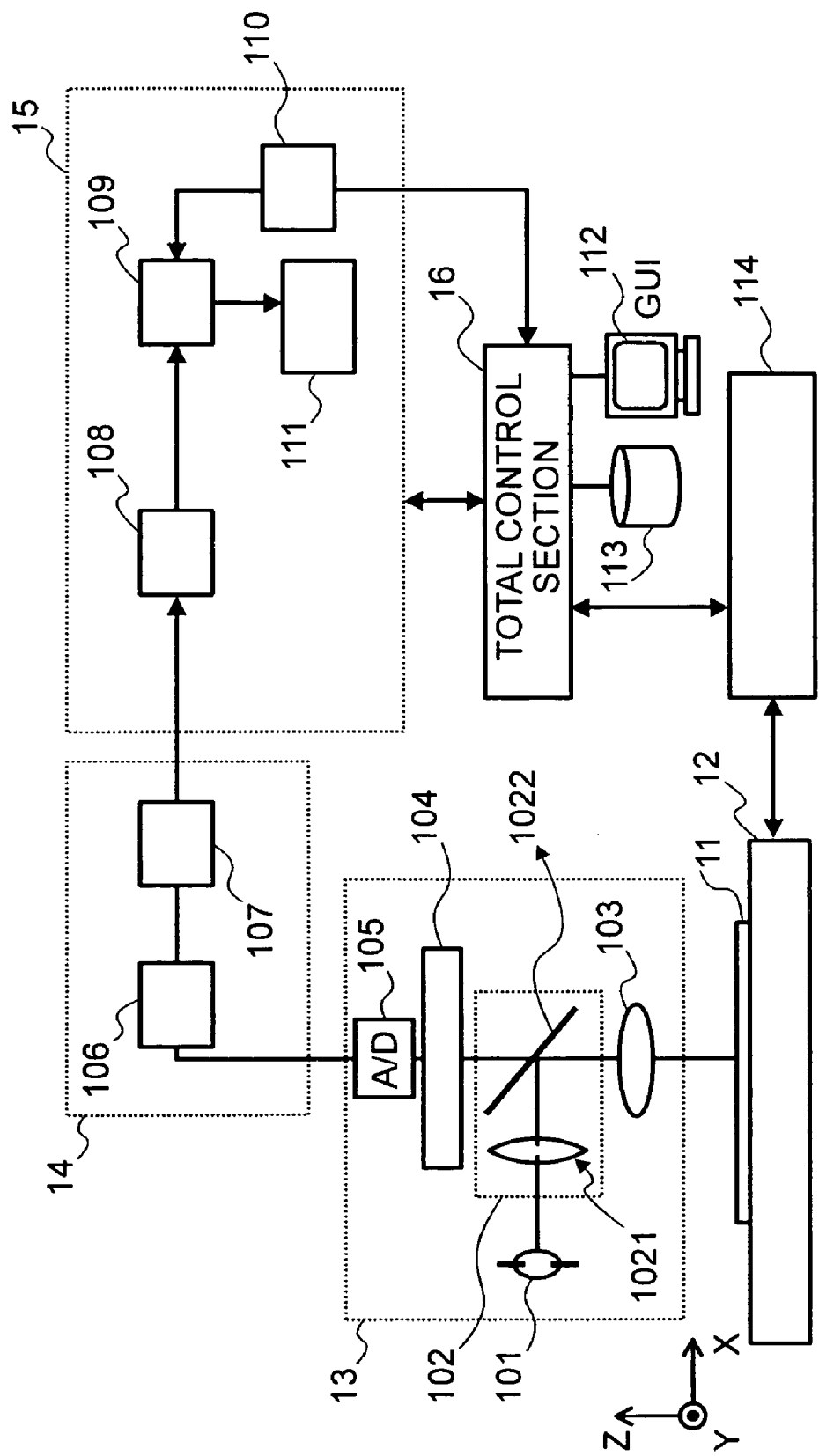

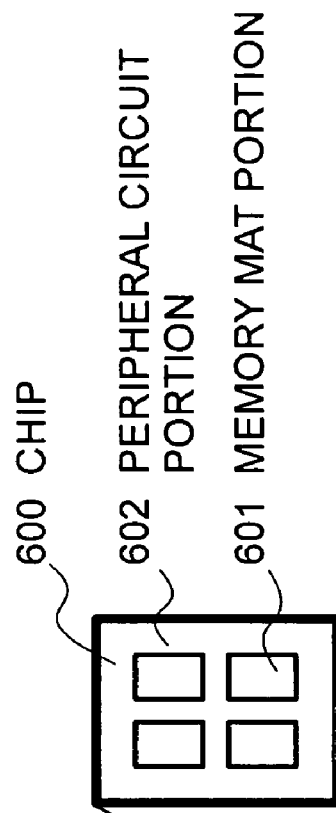
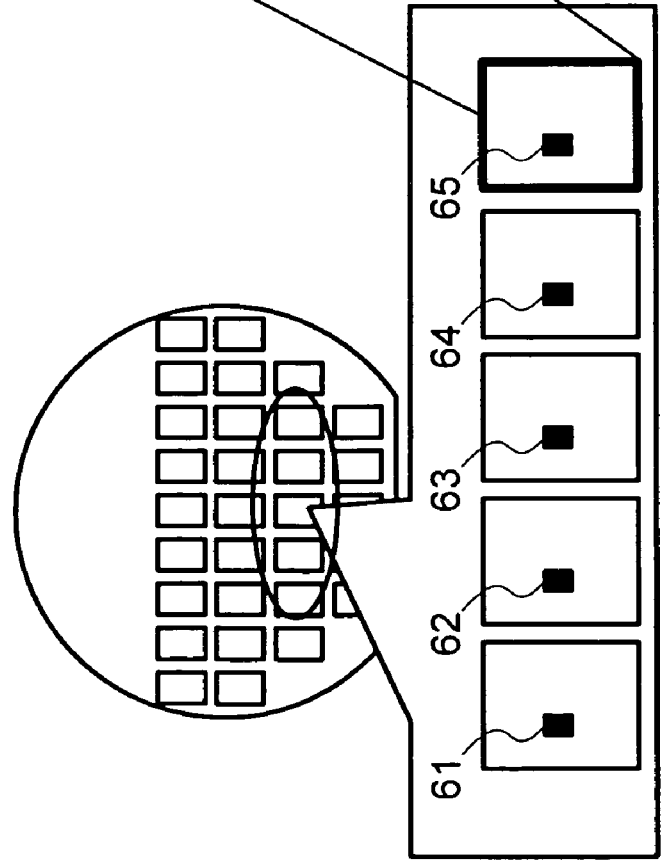
FIG.2A
FIG.2B

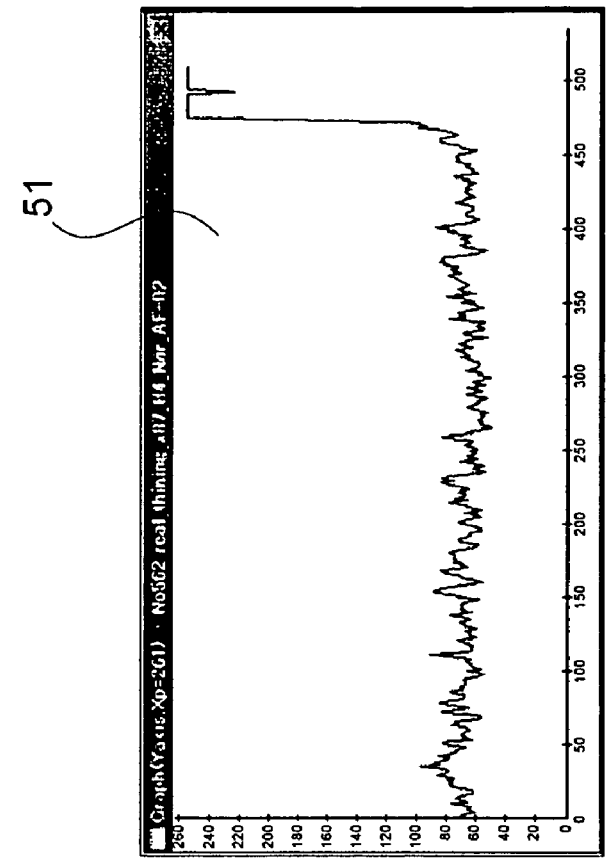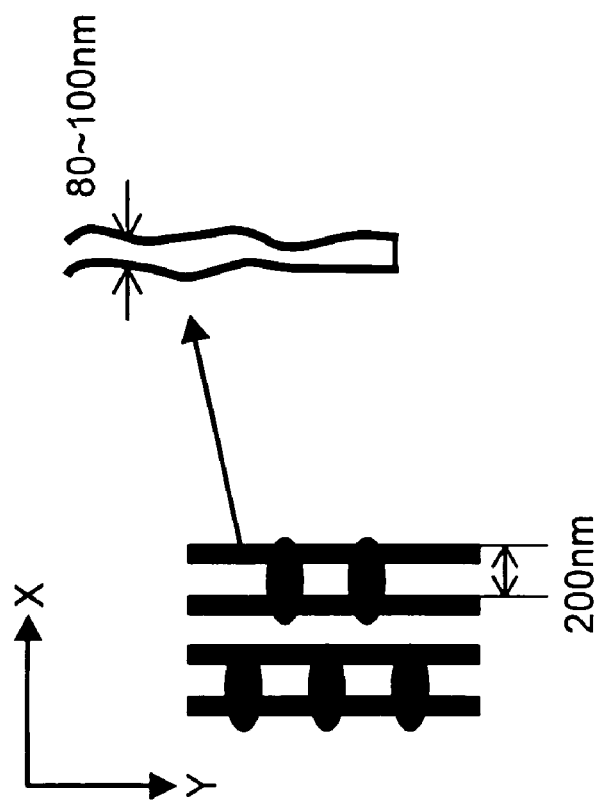

INTER-WAFER DETECTION RESULT INTEGRATION

1702

METHOD AND APPARATUS FOR INSPECTING A DEFECT OF A PATTERN

BACKGROUND OF THE INVENTION

The present invention relates to pattern inspection for detection of, for example, a defect and foreign matter by using an image of an object obtained in the manner that the object is irradiated with light or laser and is thereby imaged. More specifically, the invention relates to an apparatus and method for inspecting patterns (or, a "pattern inspection apparatus" and a "pattern inspection method", hereafter) well suited for exterior inspection of, for example, semiconductor wafers, thin-film transistors (or, "TFTs," hereafter), and photomasks.

As an existing technology, a method of detecting a defect through comparison between an inspection targets image and a reference image is known, as is disclosed in, for example, in Japanese Unexamined Patent Application Publication No. 05-264467 (or, 1996-264467).

According to this disclosed method, inspection target samples with repetitious patterns regularly arranged are serially imaged by a line sensor, respective imaged images are compared with an image with a time lag corresponding to a repetitious pattern pitch, and a mismatch portion is detected to be a pattern defect. An existing inspection method of this type will be described hereinbelow with reference to an exemplified case of exterior inspection of a semiconductor wafer. As shown in FIGS. 2A and 2B, a large number of chips of same patterns are arranged on an inspection target semiconductor wafer. As shown in FIG. 2B, a respective one of the chips can be broadly categorized into a memory mat portion 601 and a peripheral circuit portion 602. The memory mat portion 601 is a group of small repetitious patterns (cells), and the peripheral circuit portion 602, basically, is a group of random patterns. Generally, a portion such as the memory mat portion 601 has high pattern density, and an image taken thereof by a brightfield illumination optical system is dark. In contrast, the peripheral circuit portion 602 has low pattern density, and an image taken thereof is bright.

In the existing exterior inspection, the peripheral circuit portion 602 performs an inspection by comparing same positions of adjacent chips, such as regions 61 and 62 of FIG. 2A, and detects a portion with a brightness difference greater than a threshold value to be a defect. Such inspection will be alternatively referred to as "chip comparison." The memory mat portion 601 performs an inspection by comparing images of adjacent cells, and similarly detects a portion with a brightness difference greater than a threshold value to be a defect. Such inspection herebelow will be alternatively referred to as "cell comparison."

In an inspection target semiconductor wafer, planarization by CMP (chemical mechanical polishing) or the like causes delicate differences in pattern film thickness, thereby causing local brightness differences across images of chips in association therewith. As in the existing method, when a portion where the differential value is greater than or equal to a threshold value TH is determined to be a defect, even such a region having such brightness differences is determined to be defect. However, such a defect should not be detected as an essential defect. Such a detection result is caused in association with misreporting. Conventionally, as a method for avoiding occurrence of such a misreported event, a threshold value for defect detection is increased. However, the method causes reduction in the sensitivity, so that a defect corresponding to a differential value of an equivalent level or lower cannot be detected. Further, in the aligned chips shown in FIG. 2A, a brightness difference in association with the film thickness difference can occur, for example, only in an area between specific chips in the wafer or in an area of a specific patter in the wafer. When the threshold value TH is set in accordance with such the local area, the overall inspection sensitivity is significantly reduced or impaired.

Causes of impairing the sensitivity include variations in pattern edge thickness. FIGS. 10A to 10C are schematic view of a semiconductor pattern used as an inspection target. Gates are provided at about a 200 nm pitch, and there is a linewidth variation of about 20 nm. Numeral 51 in FIG. 8C represents a brightness waveform in the direction of comparisons of target patterns across which small linewidth variations are occurring. In this case, there exist brightness value variations. According to the existing method of comparison inspection, when a brightness value variation such as described above is present across images of adjacent cells or adjacent chips, the variation appears as noise during the inspection.

Alternative cases are that a defect of the above-described type can be detected through combination of factors dependant on, for example, the material, surface roughness, size, depth, and the like and factors, such as illumination conditions, dependant on the detection system.

SUMMARY OF THE INVENTION

The present invention is intended to solve such problems as described above with the existing inspection technology. Accordingly, the invention is intended to implement high sensitive pattern inspection in the manner that a brightness variation across a comparison image caused in association with a film thickness difference and a pattern edge thickness difference by using a pattern inspection apparatus that performs comparisons of images of regions corresponding to patterns formed to be same patterns and that determines a mismatch portion to be a defect.

Further, the present invention is intended to implement precise inspection only of a specific pattern without being influenced by a neighboring brightness variation (occurring in a neighboring portion) in the event that the specific pattern is preliminarily known to be prone to a critical defect.

Further, the present invention performs comparison inspections under multiple shiftable inspection conditions and then performs a comparison inspection through either integration of the inspection results or integration of images under different detection conditions, thereby implementing high sensitive pattern inspection capable of being applied to inspection for an increased variety of defects.

According to the present invention, a pattern inspection apparatus has a configuration that performs comparisons of images of regions corresponding to patterns formed to be same patterns and determines a mismatch portion to be a defect. In the configuration, high sensitive pattern inspection can be performed by reducing brightness variations across comparison images occurring in association with film thickness differences and pattern edge thickness differences, thereby enabling high sensitive pattern inspection capable of being applied to inspection for a large variety of defects.

Further, according to the present invention, in the pattern inspection apparatus, comparisons are performed under multiple shiftable inspection conditions, and either the results thereof are integrated or the comparison inspection is performed through integration of images under different detection conditions, thereby enabling high sensitive pattern inspection capable of being applied to inspection for a large variety of defects.

Further, according to the present invention, in the pattern inspection apparatus, which performs comparisons of images of regions corresponding to patterns formed to be same patterns to thereby determine a mismatch portion of an image to be a defect has a configuration that includes multiple shiftable detection systems, multiple sensors capable of synchronously acquiring images of multiple detection systems different from one another, an image comparison method corresponding to the sensors, and a defect classification method corresponding to the sensors. Thereby, an optimal condition can be selected, and a variety of defects can be detected.

The configuration further includes means that creates a reference pattern by integrating information of multiple same patterns and that performs comparisons between the reference pattern with inspection target patterns. Thereby, a defect can be detected with high sensitivity even when a brightness difference is occurring across inter-image same patterns in association with a pattern linewidth difference.

The configuration further includes means that extracts feature amounts from respective ones of multiple same patterns and that performs comparisons between the feature amounts and feature amounts extracted from the inspection target patterns. Thereby, even when an inter-image brightness difference is occurring across the same patterns in association with a pattern linewidth difference or the like, the defect can be detected with high sensitivity.

The configuration further includes means that extracts defect candidates through respective comparisons between the multiple same patterns and the defect candidates and that integrates the defect candidates extracted through the comparisons, thereby enabling sensitive defect detection even in the case that an inter-image brightness difference is occurring across the same patterns in association with a pattern linewidth difference.

The configuration further includes means of detecting a statistical offset value to be a defect candidate from the feature amount of the image. Thereby, for the inspection targets in the wafer, even when an inter-image brightness difference is occurring across the same patterns in association with an intra-wafer film thickness difference in the wafer, a defect can be properly detected.

The configuration further includes means of collecting and integrating statistical offset values, which are detected in a local region, from a wider region; and means of integrating the offset values with past different comparison inspections and detecting a final offset value to be a defect. Thereby, even when a large brightness difference is caused across specific inter-image patterns in association with an intra-wafer film thickness difference, such a difference can be restrained.

Further, the configuration includes means that retrieves a specific pattern from images of inspection target patterns and multiple comparison patterns and that inspects only the specific pattern retrieved and extracted. Thereby, even when a large brightness difference is caused across specific inter-image patterns in association with an intra-wafer film thickness difference, a critical defect can be detected with high sensitivity.

Further, according to the present invention, pattern images of a large number of chips formed on the wafer are separated into images in a chip comparison region and images in a cell comparison region, and image processes of a chip comparison and a cell comparison are parallel executed. Thereby, image detections with the stage movement can be completed in one time. Further, the throughput can be improved by combination with the parallel processing of the chip comparison and the cell comparison.

Further, according to the present invention, the high sensitivity inspection can be implemented and the inspection of a large variety of defects can be performed by either the comparison through the integration of images corresponding to multiple optical conditions or the integration of comparison processes using discrete images.

Further, either brightness differences occurring across chips in association with various factors such as edge thickness differences or brightness differences occurring across comparison images in association with inter-cell brightness differences (color variations) can be restrained by performing the comparison through integration of the multiple corresponding patterns.

Further, even higher sensitivity inspection can be implemented by detecting the statistical offset value to be a defect.

Further, only a specific pattern prone to a critical defect can be inspected with high sensitivity.

These and other objects, features, and other advantages of the invention will be apparent from the following more particular description of preferred embodiments of the invention, as illustrated in the accompanying drawings.

BRIEF DESCRIPTION OF THE DRAWINGS

In the accompanying drawings,

FIG. 1 is a block diagram an overall configuration of an optical exterior inspection device;

FIGS. 2A and 2B, respectively, are a plan view of a semiconductor wafer with an enlarged view of chips and a plan view of the structure of one of the chips;

FIG. 10A is a plan view of semiconductor patterns, showing an example of brightness variations in association with width differences across inspection target patterns;

FIG. 10B is a partly enlarged plan view of the semiconductor patterns of FIG. 10A;

FIG. 10C is a diagram of a brightness waveform in the direction of comparisons of the target patterns;

FIG. 11C is a differential image shown in brightness when compared to an adjacent cell in an example of cell comparison for multiple cells;

FIG. 11D is a differential image with respect to a reference cell in an example of cell comparison for multiple cells;

DESCRIPTION OF THE PREFERRED EMBODIMENTS

Figure 3:
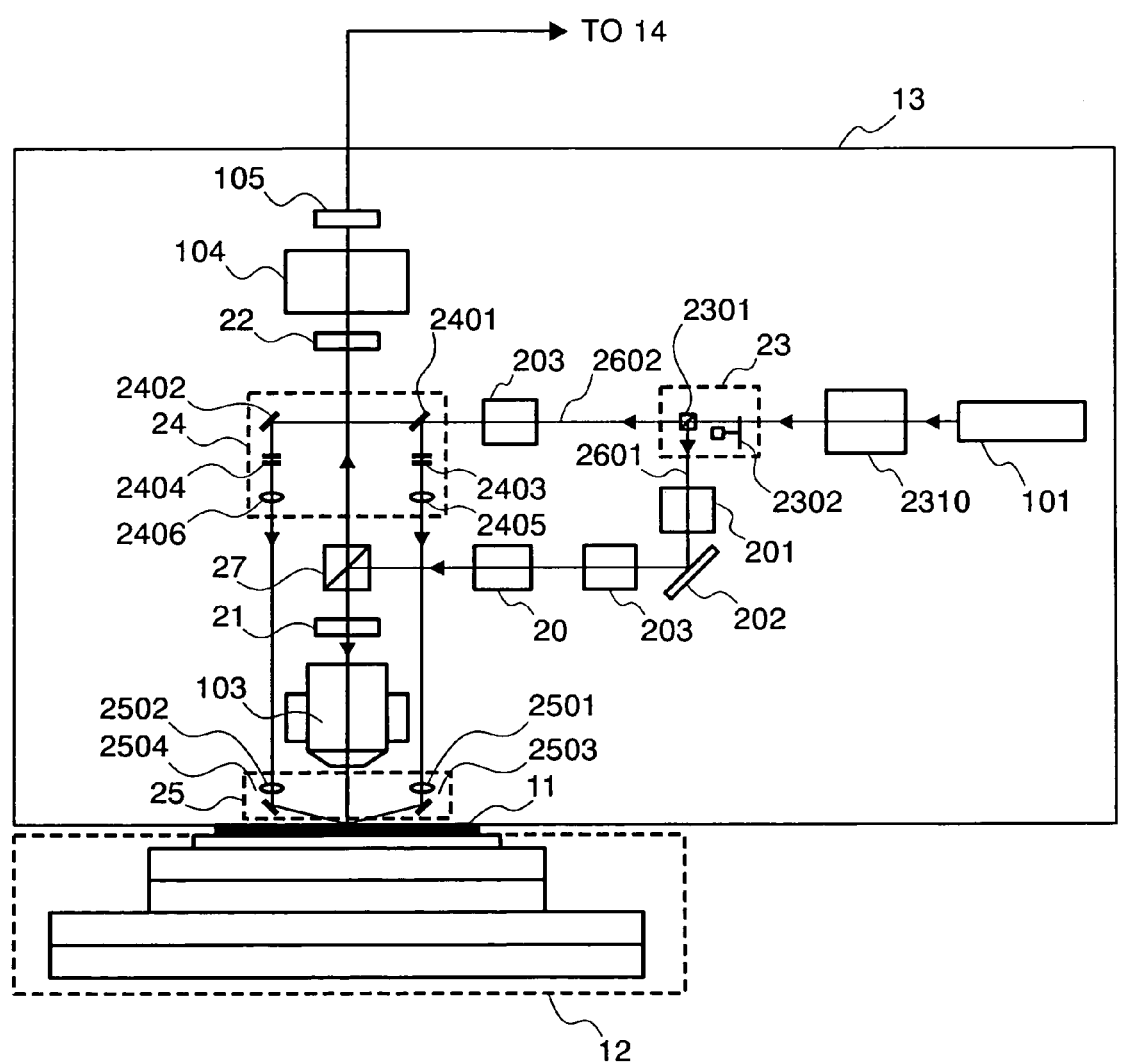
FIG. 3 is a detailed block diagram of a detecting section of the optical exterior inspection device.

One embodiment of the present invention will be described below with reference to the drawings.

In addition, a pattern inspection apparatus according to the present embodiment includes imaging means that images optical images of patterns; storage means that stores multiple types of detection conditions of the optical images for being used by the imaging means to image the optical images of the patterns; and defect candidate extraction and classification means that sequentially detects the optical images of the patterns through the imaging means to thereby acquire multiple images different from one another in the detection condition by using the multiple types of detection conditions stored in the storage means and that extracts and classifies defect candidates by processing the multiple images different from one another in the detection condition.

In addition, a pattern inspection apparatus according to the present embodiment includes imaging means that images optical images of patterns; storage means that stores images acquired in a manner that inspection target patterns and multiple comparison patterns formed to have essentially the same shapes as the inspection target patterns are sequentially imaged by the imaging means; pattern extracting means that searches for and extracts a specific pattern from images of the multiple comparison patterns; defect candidate extracting means that detects defect candidates from the images of the inspection target patterns by using information of the specific pattern extracted by the pattern extracting means; and defect candidate classifying means that classifies the defect candidates detected by the defect candidate extracting means.

The embodiment will be described with reference to an example of a defect inspection method used for an optical exterior inspection device for semiconductor wafers as inspection targets. FIG. 1 shows an example of the configuration of the optical exterior inspection device. Numeral 11 denotes a sample (inspection target, such as a semiconductor wafer), numeral 12 denotes a stage movable and turnable within an XY plane and movable in the Z direction with the sample 11 being mounted thereon, and numeral 13 denotes a detecting section. The detection section 13 has a configuration including a light source 101 that irradiates the sample 11 with light; an illumination optical system 102 including a lens system 1021 that collects the light emitted from the light source 101, and a beamsplitter 1022 that converts a light path; an objective lens 103 that illuminates the sample 11 with illumination light collected by the illumination optical system 102 and that images an optical image acquired through reflection by the sample 11; an image sensor 104 that receives the imaged optical image and that converts the optical image into an image signal; and an A/D (analog/digital) converter 105 that converts an input signal from the image sensor 104 into a digital signal.

In the example shown in FIG. 1, a lamp is used as the light source 101, however, a laser may instead be used. In addition, the wavelength of the light emitted from the light source 101 may be either a short wavelength or broadband wavelength light (white light). For using the short wavelength, ultraviolet wavelength light (ultraviolet light (UV light)) as well may be used to enhance the resolution of an image that is to be detected ("detection image," hereafter) (to detect a small defect). In the case that, as the light source, laser, more specifically, laser having a single wavelength is used, means (not shown) for reducing the coherence should be provided either in the interior of the illumination optical system 102 or between the light source 101 and the illumination optical system 102.

As the image sensor 104, a time delay integration image sensor (TDI image sensor) formed of multiple one-dimensional image sensors two-dimensionally arranged may be employed. In this case, a signal detected by the respective one-dimensional image sensor is transferred to the next-stage one-dimensional image sensor in synchronism with the movement of the stage 12 and is added. Thereby detection can be performed with relatively high speed and sensitivity. As the TDI image sensor, a parallel-output sensor having multiple output taps may be used. Thereby, outputs from the sensor can be processed in parallel, so that even higher speed detection can be performed.

In the case that the sensor for emanating UV light emanating is employed as the light source 101, a sensor of a reverse side irradiation type may be used as the image sensor 104. In this case, the detection efficiency can be improved to be higher than in the case that a sensor of an obverse surface irradiation type is used.

Numeral 14 denotes an image edit section configured to include a preprocessing section 106 and an image memory 107. The preprocessing section 106 performs image corrections, such as shading correction and dark level correction, for digital signals detected by the detection section 13, and the image memory 107 stores corrected digital signals.

Numeral 15 denotes an image comparison processing section that performs an operation including calculation for determining a defect candidate in the wafer or sample. The operation compares images of corresponding regions stored in the image memory 107 of the image edit section 14, performs a statistical process to extract an offset value, and determines it to be a defect. More specifically, the operation first reads out digital signals of an image of an inspection target region (which hereinbelow will be referred to as a "detection image") and an image of a corresponding region (which hereinbelow will be referred to as a "reference image") stored in the image memory 107. Then, a correction amount for positional alignment is calculated in a position shift detecting section 108, and positional alignment of the detection images and the reference image is performed by using a correction amount calculated by a statistical processing section 109. Then, using a feature amount of a corresponding pixel to a pixel having a statistical offset value is output to be a defect candidate. A parameter setting section 110 sets an image processing parameter, such as a threshold value to be used in extraction of a defect candidate from a differential value, and supplies it to the statistical processing section 109. Then, in a defect classifying section 111, a true defect is extracted from a feature amount of the respective defect candidate and is classified.

Numeral 16 denotes a total control section that includes a CPU (built in the total control section 16) and that is connected to a user interface section 112 (GUI (graphical user interface)) and a storage section 113. The user interface section 112 has display means and input means with which, for example, changes in inspection parameters (threshold value and the like to be used in image comparison) are received from users and detected defect information is displayed. The storage section 113 stores, for example, feature amounts and images of defect candidates. Numeral 114 denotes a mechanical controller that drives the stage 12 in accordance with a control instruction received from the total control section 16. The image comparison processing section 15, the detection section 13, and the like also are each driven in accordance with an instruction received from the total control section 16.

As shown in FIG. 2, a large number of chips having the same pattern are regularly arranged in the semiconductor wafer 11. The total control section 16 performs control as follows. The semiconductor wafer 11 being used as a sample is continually moved with the stage 12, and images of the chips are sequentially detected and retrieved by the detecting section 13 in synchronism with the movement of the semiconductor wafer 11. Then, for the detection images, in accordance with the above-described procedure, digital image signals of regions 61, 62, 64, and 65 are compared as reference images to, for example, a region 63 of the detection image of FIG. 2, which is located in the same position as the regularly arranged chips, whereby, a pixel having a statistical offset value is detected as a defect candidate.

The detection section 13 of the pattern inspection apparatus according to the present embodiment has multiple shiftable detection systems. FIG. 3 shows a detailed view of the detection section 13.

In the configuration in FIG. 3, a case where, as the light source 101, a pulse laser light source for emanating pulse laser of ultraviolet light (UV light, such as deep ultra violet light (DUV light)) is used.

Numeral 2310 denotes a quasicontinuous optical system. With this system, laser corresponding to one pulse of pulse laser emanated from the light source 101 is resolved into multiple pulses without changing the total amount of light. Thereby, the peak value of the pulse laser emanated from the light source 101 is reduced, and the number of pulses is increased, whereby the light is rendered quasicontinuous. In this manner, the time-wise amounts of light are averaged or substantially equalized. The light (laser) passed through the quasicontinuous optical system 2310 is incident on a light-path splitting optical system 23. The light source 101 may be either a visible light laser or a lamp. In this case, however, the quasicontinuous optical system 2310 is not necessary.

The light incident on the light-path splitting optical system 23 transmits through coherence reducing means 2302, and is then split by a beamsplitter 2301 for two light paths 2601 and 2602. The light split for the light path 2601 is incident on a beam forming optical system 201, and is subjected to, for example, beam diameter regulation and illuminance regulation in the beam forming optical system 201. The light emanated from the beam forming optical system 201 is bent by a mirror 202, and is incident on a coherence reducing optical system 203. Then, temporal and spatial coherence is reduced in the coherence reducing optical system 203. The light output from the coherence reducing optical system 203 is incident on a deformation illumination optical system 20, and is regulated so that an illuminance distribution at the pupil position of the objective lens 103 becomes a desired distribution. Of the light output from the deformation illumination optical system 20, an S polarized component is reflected in a polarization beam splitter 27 to the side of the objective lens 103, and is led to irradiate the wafer 11 through a light modulator unit 21 and the objective lens 103. "Brightfield illumination" hereinbelow refers to illumination of the wafer 11 by the light that has advanced along the above-described light path and has transmitted through the objective lens 103.

With the light having thus been split to the side of the light path 2601, illumination adaptable for a wafer having undergone various processes can be implemented. This can be implemented in the manner that the illuminance distribution of the illumination light at the pupil position of the objective lens 103 is changed into multiple types of illumination distribution by using the deformation illumination optical system 20. The deformation illumination optical system 20 may be, for example, a filter having the light transmittance changed on an optical axis cross section or an optical device that forms four or eight light fluxes arranged point-symmetric about the optical axis. Still alternatively, a device capable of oscillatorily moving beams may be used to change the beam position. The device capable of oscillatory moving the beams is, for example, a galvano-mirror or a semiconductor resonance mirror. The deformation illumination optical system 20 is configured to switchably use such the devices.

The light split by the beamsplitter 2301 to the side of the light path 2602 is transmitted through the coherence reducing optical system 203. Then, the light enters a polarization-light darkfield illumination optical system 24, and is further split by a partial mirror 2401 for two light paths. One ray of the split light transmits through optical devices 2403 and 2405 and enters a polarization-light darkfield illumination optical system 25. The other ray of the split light is reflected off of a total reflection mirror 2402, transmits through the optical devices 2403 and 2405, and then enters the polarization-light darkfield illumination optical system 25. The respective rays of light having entered the polarization-light darkfield illumination optical system 25 transmit through optical devices 2501 and 2502, are reflected off of mirrors 2503 and 2504, thereby irradiating the surface of the wafer 11 from a diagonal direction. "Darkfield illumination" hereinbelow refers to the illumination of the surface of the wafer 11 from the diagonal direction.

Of the respective rays of reflected light of the light traveled along the light path 2601 or 2602 and irradiated on the wafer 11, the ray of the light collected by the objective lens 103 transmits through the light modulator unit 21, the polarization beam splitter 27, and a light modulator unit 22, and is then imaged on a detection face of the image sensor 104. An optical image thus imaged is detected by the image sensor 104. A detection signal of the image sensor 104 is converted by the A/D converter 105 into a digital signal, and the digital signal is output from the detection section 13. Multiple detection signals are output in parallel from the image sensor 104. The multiple detection signal output in parallel are A/D converted and output in parallel.

The light modulator unit 21 controls, for example, the light amounts and phases of illumination light derived from the light split to the side of the light path 2601 and reflected light from the wafer 11. For example, the light modulator unit 21 regulates a light amount ratio between rays of zero order and high order diffractive light reflected off the wafer 11, thereby to improve the contrast of a circuit pattern signal detected by the image sensor 104. Alternatively, the contrast of a circuit pattern is improved through polarization differential interference. The light amount ratio between rays of zero-order and high-order diffractive light reflected from the wafer can be regulated in the manner that a ½ wavelength plate and a ¼ wavelength plate are provided in the light modulator unit 21, whereby the rays are combined to change the light oscillation direction. In addition, the polarization differential interference can be implemented in the manner that a birefringence prism is provided in the light modulator unit 21 and is used. A physical phenomenon resulting from a polarization differential interference optical system using a single Nomarski prism is similar to that resulting from a general differential interference microscope. In the light modulation unit 21, such a ½ wavelength plate, ¼ wavelength plate, and birefringence prism are provided to be shiftable by means (not shown).

The light modulator unit 22 is placed in a position conjugated with the pupil position of the objective lens 103, thereby enabling optical modulation at the pupil position. For example, a dielectric film is vapor-deposited in a central portion of a transparent substrate such as quarts, and the transmittance of the dielectric film portion is changed, thereby to modulate the light detected by the image sensor 104. In this case, a unit light-shielded with metal may be used instead of the dielectric film. The unit also is provided to be shiftable.

Figure 4:
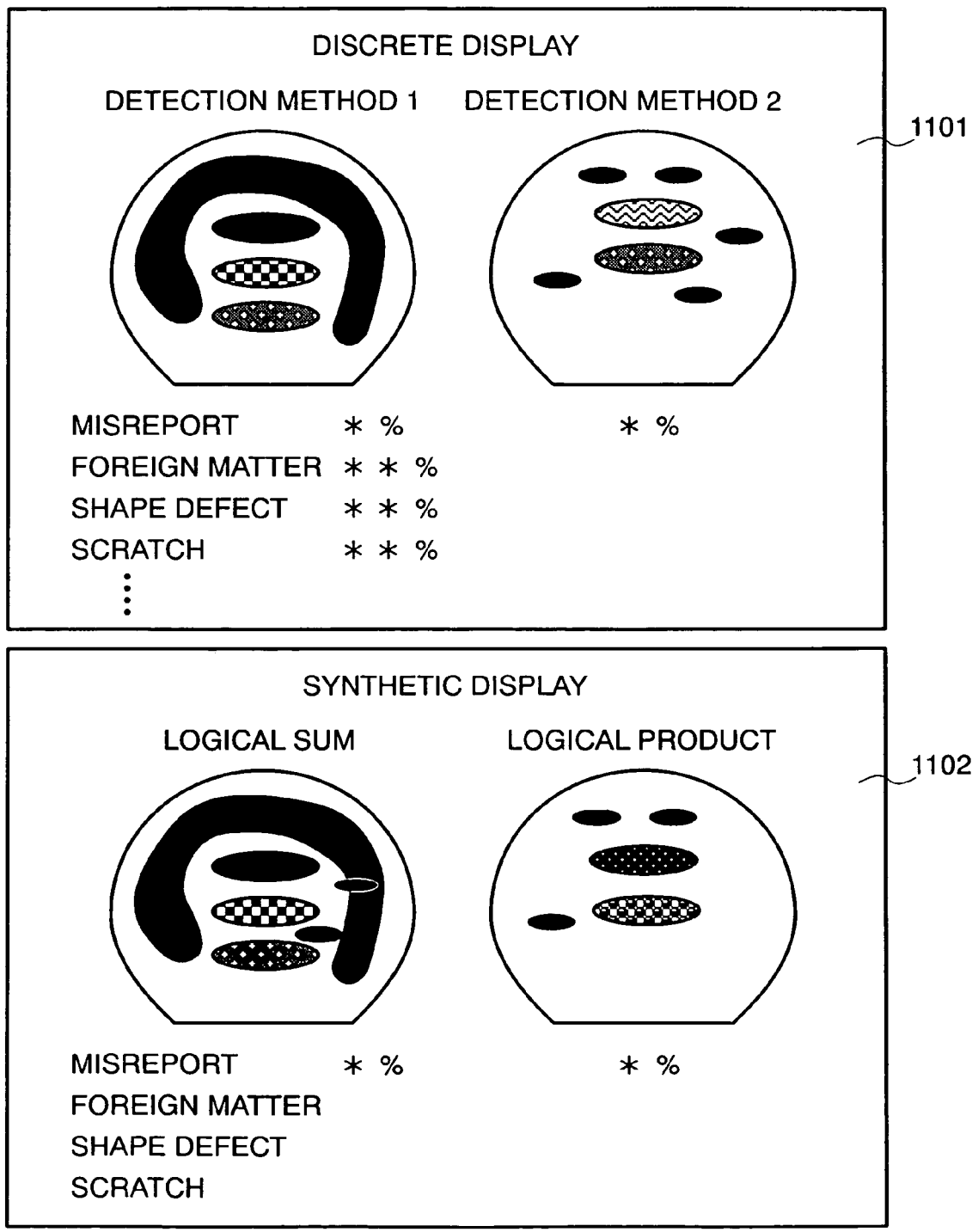
FIG. 4 shows front views of screens each showing the results of inspection and classification performed under multiple optical conditions.
Figure 5A:
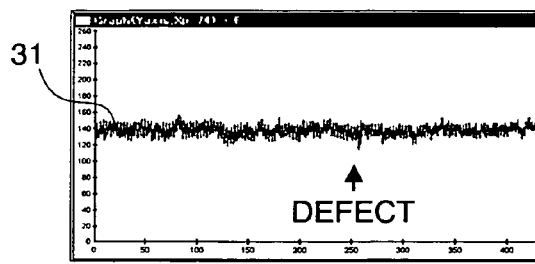
FIG. 5A is a diagram of a defect signal of an image acquired under an optical condition A.
Figure 5B:
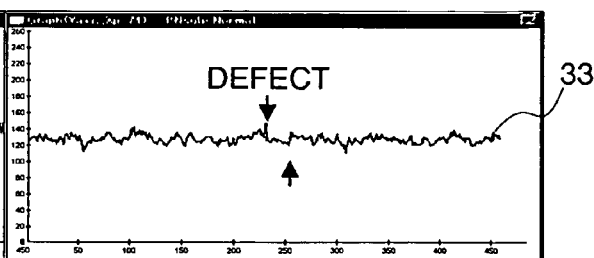
FIG. 5B is a diagram of a signal indicative of a difference in the event of comparison of an image signal acquired under the optical condition A to an adjacent cell.
Figure 5C:
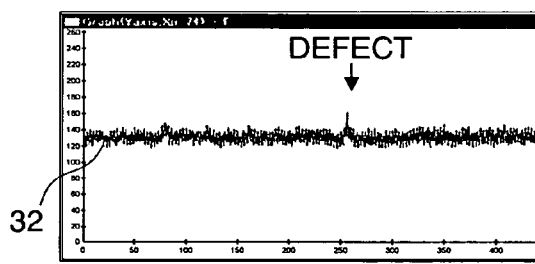
FIG. 5C is a diagram of a defect signal of an image acquired under an optical condition B.
Figure 5D:
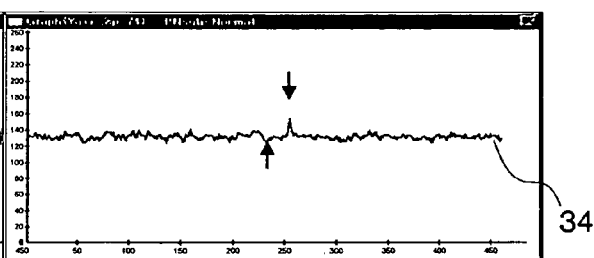
FIG. 5D is a diagram of a signal indicative of a difference in the event of comparison of an image signal acquired under the optical condition B to an adjacent cell.
Figure 5E:
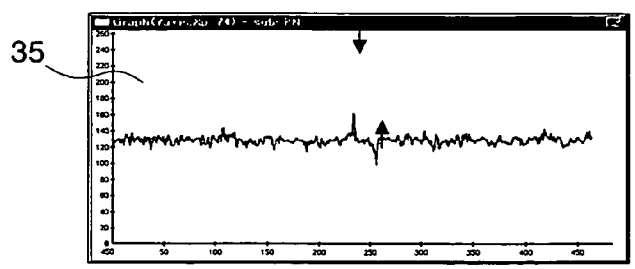
FIG. 5E is a diagrams of a signal indicative of a difference in the event that images respectively acquired under the optical conditions A and B are synthesized and then compared to an adjacent cell after.

As described above, the configuration has, for example, the light modulator unit and the function of synchronously irradiating the deformation illumination and the darkfield illumination with the brightfield illumination, whereby optimal inspection can be performed by selection of an optimal optical system corresponding to, for example, the type of a defect desired to detect. However, for detecting even more types of defects, it is effective to perform the inspection of a single wafer 11 under multiple optical conditions. In this case, the following operations are carried out in time series under the multiple optical conditions: (1) selection of an optical condition; (2) acquirement of an image by the image sensor 104; (3) extraction of a defect candidate by the image comparison processing section 15; and (4) repetition of defect detection and classification. The results of these operations can be discretely displayed in units of the optical condition, as shown in 1102 of FIG. 4. Alternatively, as shown in 1102 of FIG. 4, a logical AND, logical OR, or the like of the results of the detections performed under the respective optical conditions is obtained, thereby enabling it to display the synthesized results.

The detection results may be displayed as they are to show the presence or absence of defects. Alternatively, however, as shown in 1101 and 1102, the results of classification of detected defects may be displayed on a map, thereby to enable a user to know at a glance which condition makes it possible to optimally detect a target defect. In addition, presentation of a display on a single map in a different color in units of the condition enables the user to know at a glance correlations between the respective conditions and detected defects.

In addition, in the configuration of the inspection apparatus of the present embodiment, not only that the results of detection under multiple optical conditions are simply integrated and displayed, but also the defect detection sensitivity can be improved by performing the following operations. The operations are: (1) integration of images captured under multiple optical conditions; (2) extraction of defect candidates by the image comparison processing section 15 by using the image integrated in (1); and (3) detection and classification of defects. Effects of image integration are shown in FIGS. 5A to 5E. Numeral 31 in FIG. 5A and numeral 32 in FIG. 5C indicate defect signals of images acquired under respective optical conditions A and B different from one another. Numeral 33 in FIG. 5B denotes a signal representing a difference when the image signal of FIG. 5A acquired under the optical condition A has been compared to an adjacent cell. An image containing a defect signal is used as an inspection image and as a reference image. Accordingly, the defect signal is inverted as a difference from the comparison image and hence the signal appears in two portions, however, the defect signal 33, 34 is weak. In comparison, numeral 35 in FIG. 3E denotes a signal representing a difference in the event that the images respectively acquired under the optical conditions A and B are synthesized, and the synthesized image then is compared to the adjacent cell. Thus, the images under the different optical conditions are synthesized and processed, thereby enabling it to emphasize the defect and thence to implement high sensitivity inspection.

Figure 6:
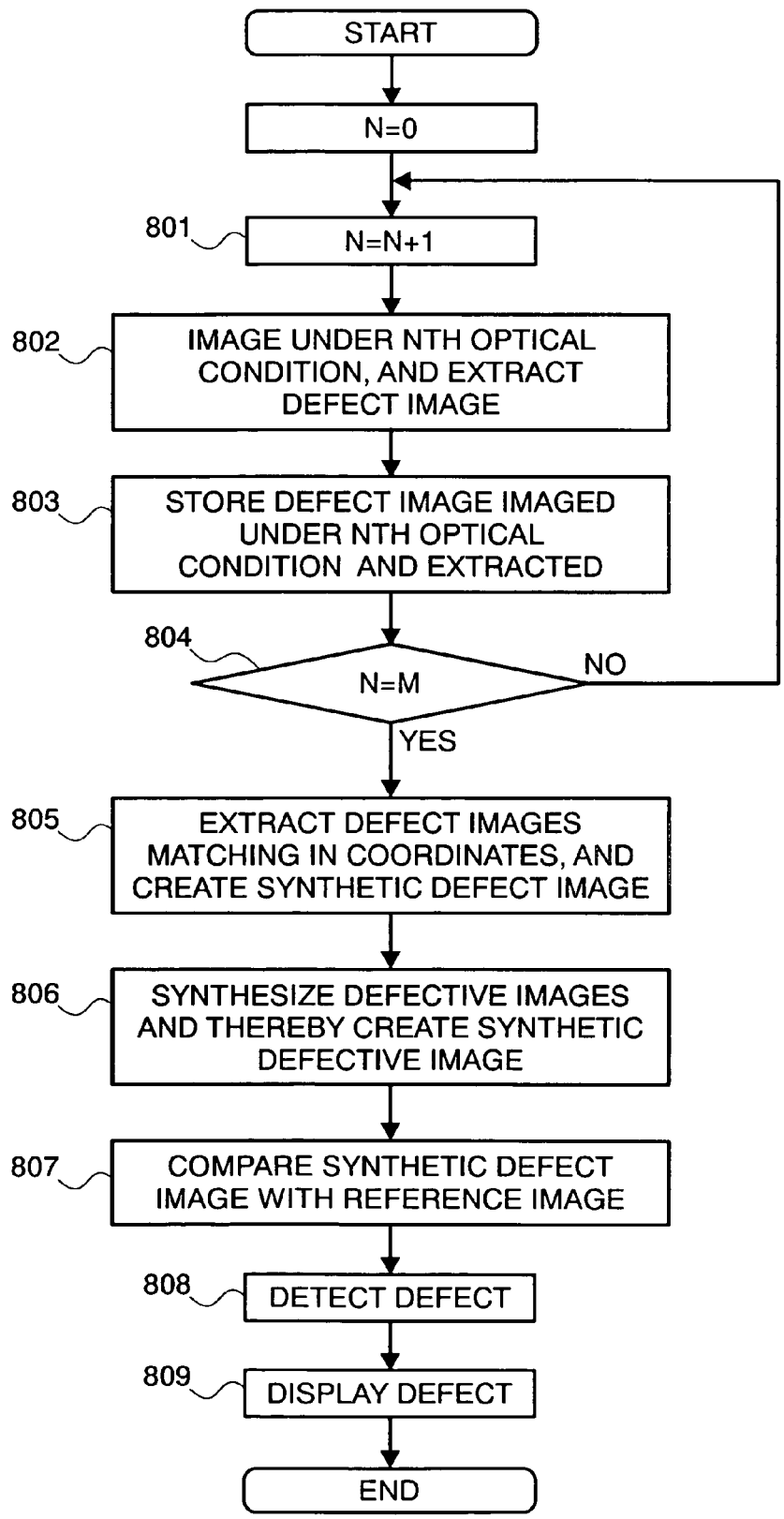
FIG. 6 is a diagram of a process flow for detecting a defect.

FIG. 6 shows an example of an image synthesis implementation method. To begin with, as described above, inspection is performed in the time series under a different optical condition (at step 801). Inspection is then performed in the time series, and a defect candidate is extracted (at step 802). A reference image corresponding to an image of a local region including the defect candidate is selected (which image hereafter will be referred to as "defective image"), and the image is stored in the storage device 113 (at step 803). Upon completion of extraction of defective images under all the conditions (at step 804), defective images under respective conditions matching with one another in the coordinates are extracted (at step 805). Then, the extracted defective images are synthesized, and a synthetic defective image is thereby created (at step 806). The created synthetic defective image again undergoes comparison with the reference image (at step 807). Thereby, a defect is detected (at step 808) and displayed (at step 809). In the above process, at the stage of extracting the defect candidate (at step 802), high sensitivity inspection including checking of misreported matter is performed, and a misreported matter is eliminated in re-inspection (at step 808) using the synthetic image, whereby high sensitivity inspection of small defects can be implemented.

According to a different mode of the image-synthesis inspection, images under different optical conditions can be synchronously acquired. By way of an example of the configuration capable of synchronously acquiring images under two different optical conditions, FIG. 7 shows a simplified view of the configuration shown in FIG. 3.

Figure 7:
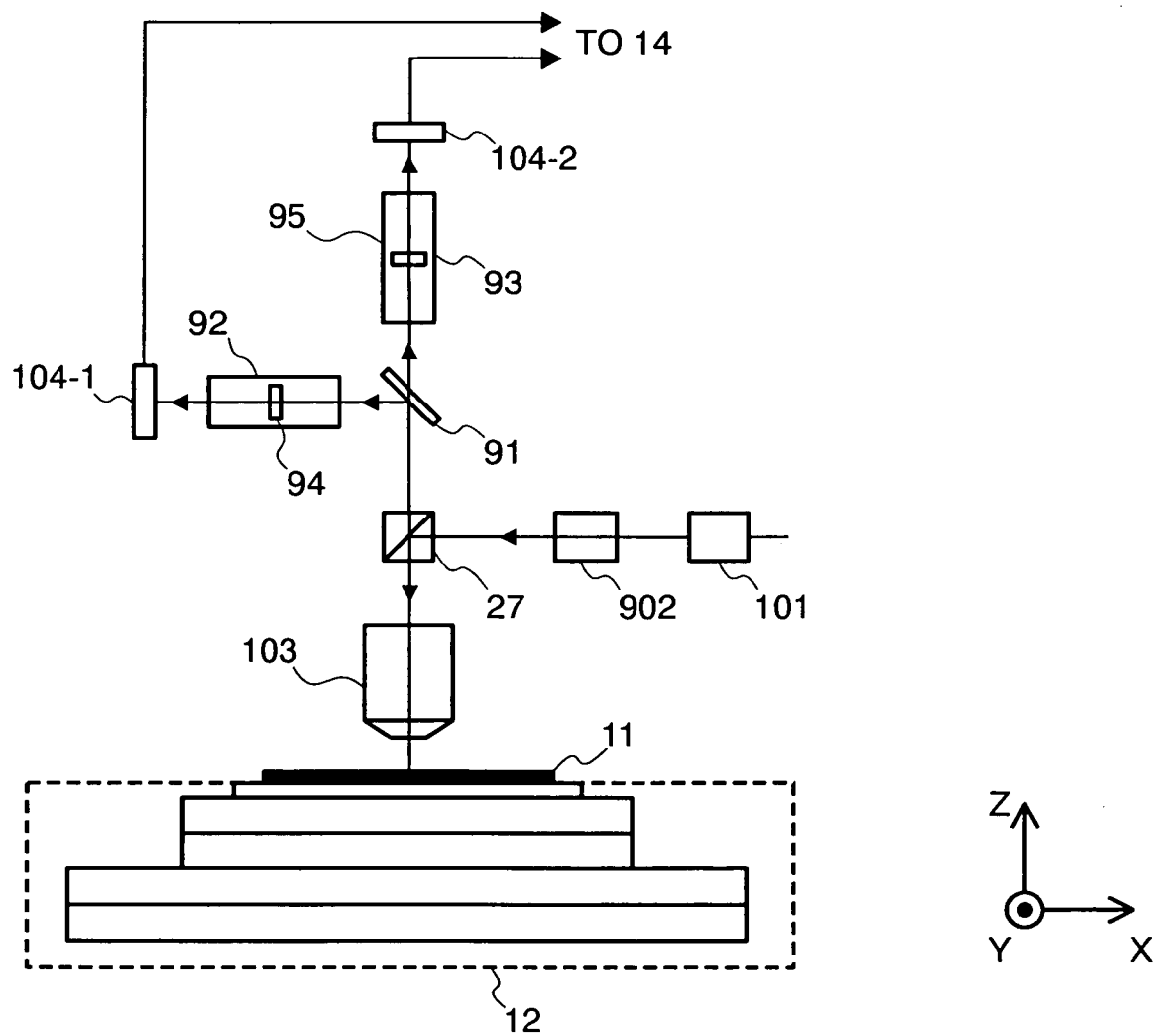
FIG. 7 is a front view showing an overall configuration of a detecting section capable of synchronously acquiring images under two optical conditions.

In the configuration shown in FIG. 7, light emanated from the light source 101 travels through an illumination formation optical system 902 and enters the polarization beam splitter 27. For a lamp being used as a light source, a lamp such as a mercury lamp or xenon lamp can be used. For a laser oscillator, the light source may be a type that performs wavelength conversion of solid YAG laser (wavelength: 1024 nm) by using nonlinear optical crystal or the like to thereby generate, for example, third and fourth harmonics of the fundamental wave. Alternatively, the usable light source may be an excimer laser or ion laser of a 248 nm wavelength or the like. Still alternatively, the light source may be, for example, an electron-beam gas emission lamp that outputs light at multiple wavelengths (wavelengths are, for example, 351 nm, 248 nm, 193 nm, 172 nm, 157 nm, 147 nm, 126 nm, and 121 nm). The illumination optical system 102 is of the type that regulates the characteristics of illumination light for irradiating the wafer 11 and that is configured to include a relay lens, an aperture diaphragm, and a wavelength selection filter, for example.

The light reflected by the polarization beam splitter 27 is led to irradiate the wafer 11 through the objective lens 103. Reflected light of the irradiation light from the wafer 11 is collected through the objective lens 103. A portion of the collected light is reflected off of a mirror 91 and is then incident on an optical system 92, and the rest of the collected light transmits therethrough and is incident on an optical system 93. In this case, the objective lens 103 is capable of performing shifting-irradiation between the brightfield illumination and darkfield illumination or synchronous irradiation thereof.

The configuration of the present embodiment includes two sets of image sensor sections. The optical systems 92 and 93, respectively, have the function of performing light modulation of incident light and collecting the light into image sensor sections 104-1 and 104-2, and are configured to include, for example, relay lenses and light modulation filters 94 and 95. The light modulation filters 94 and 95 are optical filters different from each other. As examples, the light modulation filter 94 permits only light about the optical axis center to transmit, and the light modulation filter 95 permits only light spaced away from the optical axis center. As alternative examples, the light modulation filter 94 may be of a type that permits only light having a wavelength ranged from 400 nm to 500 nm to transmit, and the light modulation filter 94 may be of a type that permits only light having a wavelength of 400 nm or less. The former filter combination is used to separately detect zero order light components and high order diffractive light components of the reflected light from the wafer 11. The latter filter combination is used to acquire per-wavelength images in the event of illumination with multi-wavelength light. Although the example cases of two types of filters are described above, the configuration is not limited to the two types. Any other combination may be employed inasmuch as optical components (such as wavelengths, spatial frequencies, and light modulation directions) obtainable by the light modulation filters 94 and 95 are different from one another.

The image sensor section 104-1, 104-2 has the function of performing photoelectrical conversion and A/D conversion of incident light, in which the converted digital signal is output to the image edit section 14.

Thus, images synchronously acquired by two image sensors are compared in the time series, as described above; and selected images (defective images) are then synthesized and compared again, whereby defects are finally detected. Thereby, the image acquirement time is the same as in the case of a single optical condition. In order to further increase the processing speeds, the configuration may be formed to include two image comparison processing sections, whereby enabling parallel extraction of defect candidates under different optical conditions.

Figure 8:
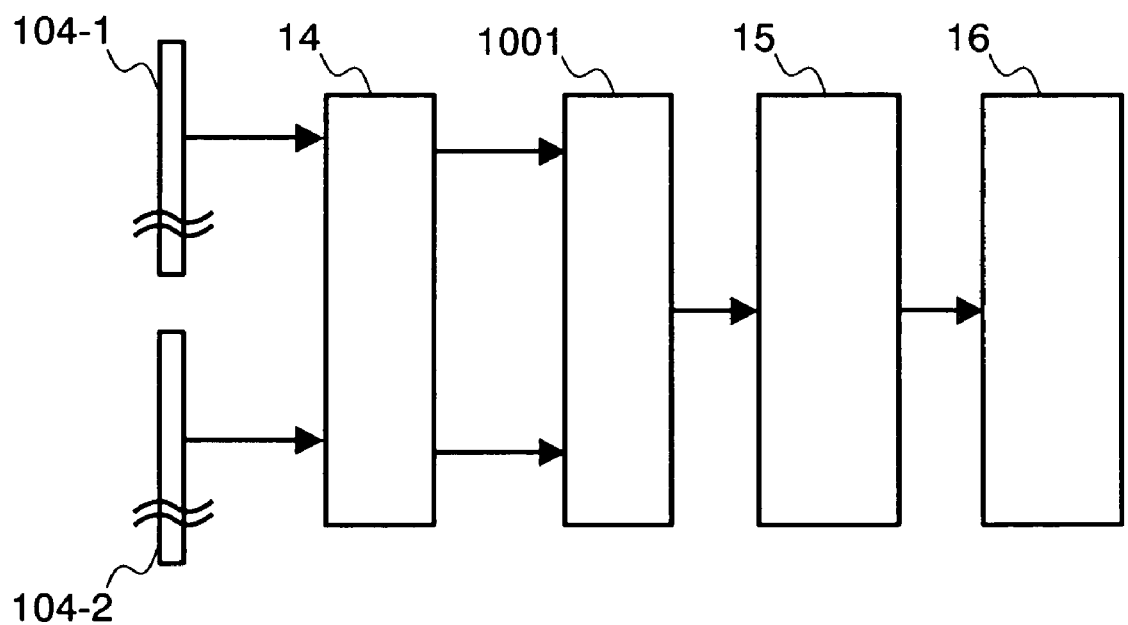
FIG. 8 is a block diagram of a flow for synthesizing images acquired under multiple optical conditions and then performing a defect detection process thereof.

Thus, according to all of the example methods described above, defect candidates are extracted in units of the optical condition, defective images are synthesized and compared again, and the defects are then finally detected. FIG. 8 shows another example of a method of performing the defect detection process after image synthesis. In the present example, respective images acquired with the same timing by two image sensor sections are corrected by the image edit section 14 and preliminarily synthesized. The synthesized image is processed by the comparison processing section 15; defects are detected and classified; and the classified result is transferred to the total control section 16 and is then displayed.

Figure 9:
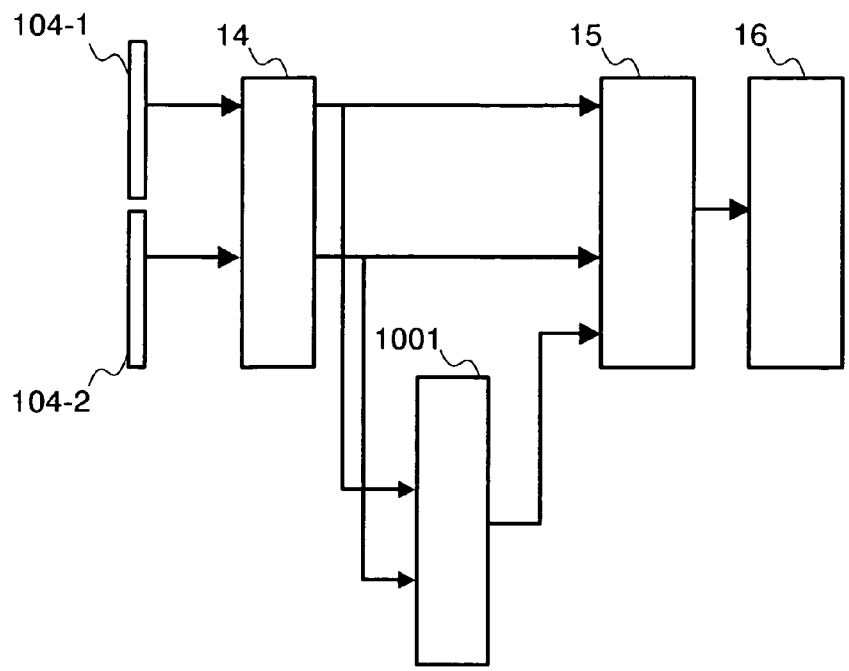
FIG. 9 is a block diagram of a processing flow for synthesizing images acquired under multiple optical conditions and thereby performing inspection thereof.

FIG. 9 is still another example of a method of performing the defect detection process after image synthesis. In the present example, in addition to an image synthesized in an image synthesizer section 1001, also original images imaged under respective conditions are corrected by the image edit section 14, and are then input into the image comparison processing section 15. Then, feature amounts of defect candidates respectively extracted from the original images and a synthetic image are integrated and classified; and the classified result is transferred to the total control section 16 and is displayed. Of course, only the respective original image can be input into the image comparison processing section 15 without using the synthetic image.

As described above, according to the inspection apparatus described with reference to the respective embodiments of the present invention, defects are detected from images acquired under multiple optical conditions, and the results are integrated. Alternatively, defects are detected from the result of integration of images imaged under respective conditions. Still alternatively, defects are detected through the integration of defect information detected from images imaged under respective conditions. Thereby, high sensitivity detection of various types of defects can be implemented.

While various types of defects of interest to users occur, there are cases where the respective types of defects are detectable by combination of target dependant factors, such as the type, material, surface roughness, size, depth, pattern density, and pattern direction of and on a sample being used as an inspection target, and optical-system dependant factors, such as illumination conditions. According to the present invention, such various types of defects can be detected in a wide range in the manner that the multiple optical conditions are selected, and information obtainable from acquired images are integrated.

The following will describe a process of the image comparison processing section 15 for detecting images will now be described herebelow. FIGS. 10A and 10B are schematic views showing one example of a semiconductor pattern as an inspection target. As shown in FIG. 10A, the semiconductor pattern has gates at a pitch of about 200 nm; and as shown in FIG. 10B, the variation in the linewidth thereof is about 20 nm. Numeral 51 of FIG. 10C denotes a brightness waveform along a comparison direction of target patterns having such small variations, and the wavelength indicates brightness value variations.

FIGS. 11A to 11D show an example of defect detection through the cell comparison from an image having brightness variations. The cell comparison compares images of adjacent cells with one another for the memory mat portion 601 formed of the group of small repetitious patterns (cells) shown in FIG. 2, and detects a portion where the brightness difference therebetween is greater than a threshold value is detected to be a defect. Numeral 1301 in FIG. 11A denotes a defect signal. In this case, there are brightness variations, such that, as in the conventional manner, when a comparison is made to a pixel spaced away at a cell pitch, cases occur in which the difference therebetween is reduced (1301(C)) and, on the other hand, the difference between normal pixels is increased (1301(D)). Alternatively, however, when a threshold value is set so as not to detect the normal pixel to be a defect, the defect is overlooked or not detected. As such, in the present embodiment method, a reference pattern is created from corresponding multiple cells. First, at least one or a greater specific number of corresponding pixels of neighboring cells are collected for a target pixel f. FIG. 12 shows an example case in which brightness values of corresponding pixels of six neighboring pixels are collected. Then, an average brightness value is calculated (in accordance with Equation 1), and the result is set as a reference image g. In Equation 1, f(i) is a brightness value of a corresponding pixel of a neighboring cell, and N is the number of collection pixels.

$$g = \sum_{i=1}^{N} f(i)/N \quad (1)$$

Figure 11A:
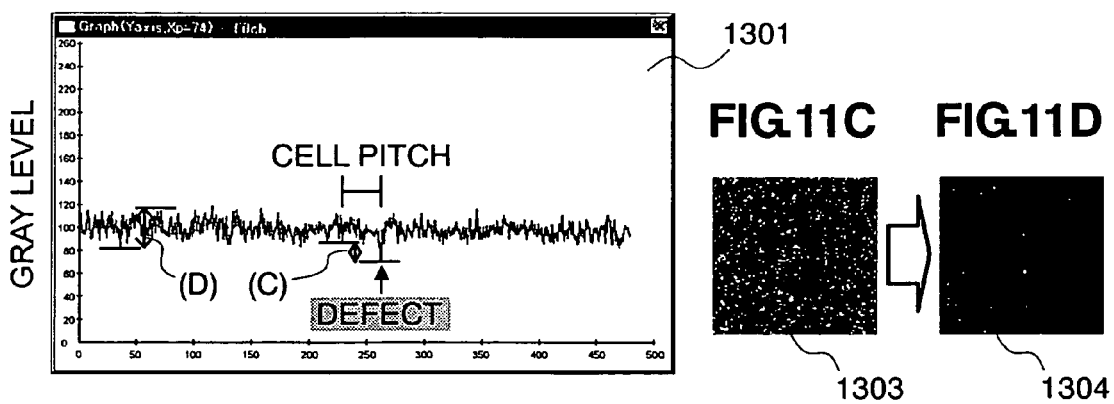
FIG. 11A is a diagram of a signal waveform including a defect in an example of cell comparison for multiple cells.
Figure 11B:
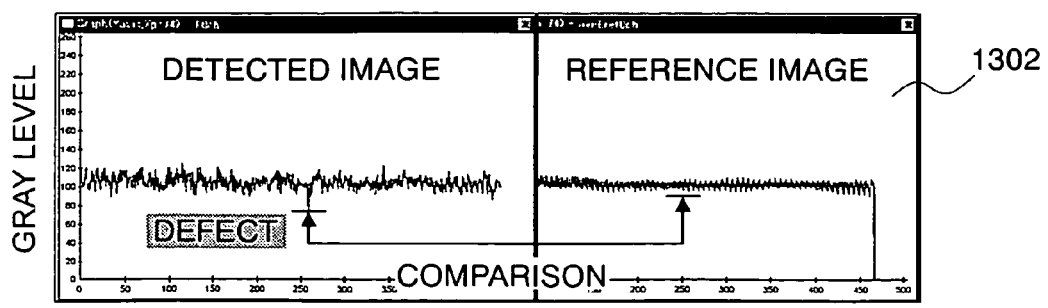
FIG. 11B is a diagram of signal waveforms of a defective image and a reference image in an example of cell comparison for multiple cells.
Figure 12:
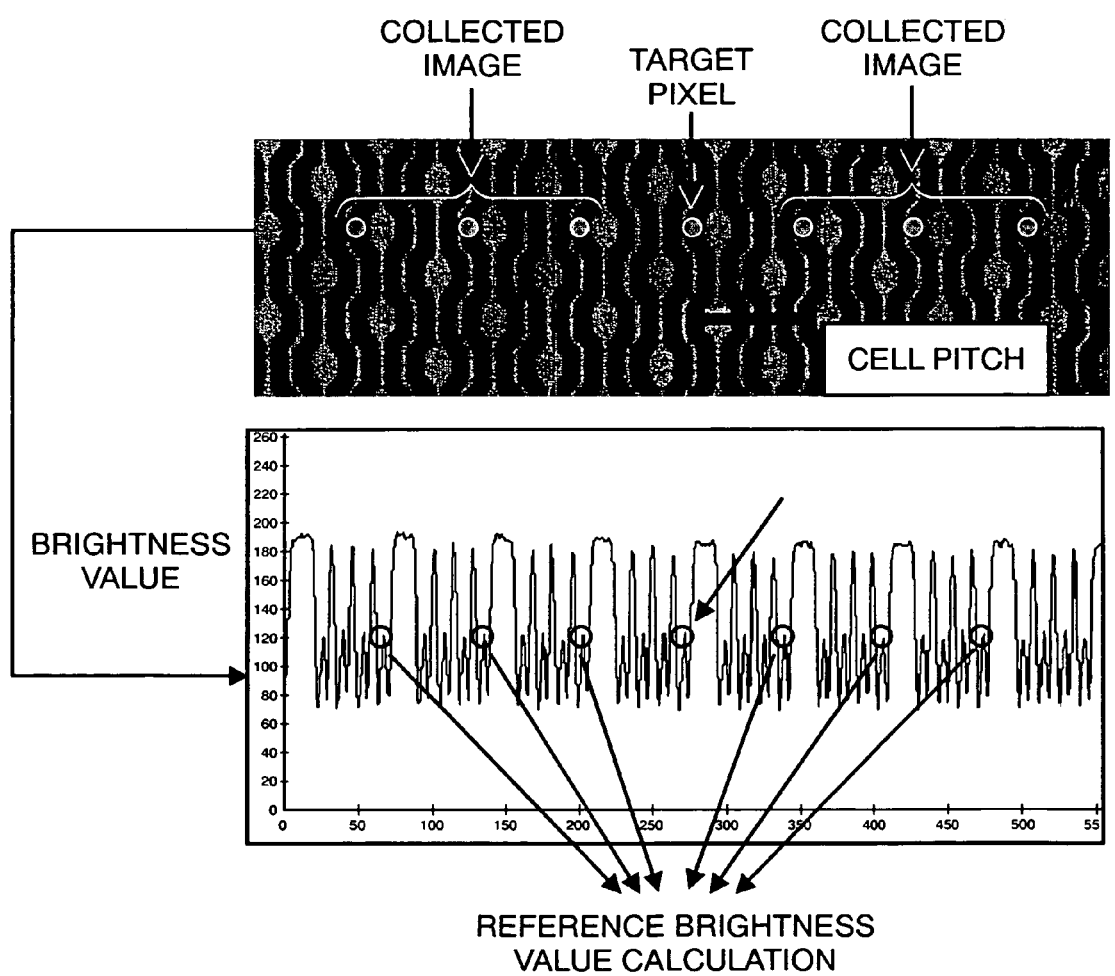
FIG. 12 is a diagram showing an example case of collecting brightness values of six neighboring pixels.

Numeral 1302 of FIG. 11B denotes a reference signal calculated from the defect signal 1301 of FIG. 11A. Numeral 1303 of FIG. 11C denotes a differential image representing the difference when compared to an adjacent cell; and numeral 1304 of FIG. 11D denotes a differential image with respect to a reference cell according to the present embodiment method. Thus, the stable defect detection can be implemented and the influence of bright nonuniformity resulting from the linewidth difference and the like can be reduced through the comparison performed in accordance with the present embodiment method. Similar effects take place as well in the case of inter-chip comparison. According to the conventional chip comparison, in the case that, basically for the peripheral circuit portion (shown by 602 in FIG. 2B), in the case that, for example, the region 63 is an inspection target region in FIG. 2A, the image of the region 63 is compared with the image of the region 62 or 64, a portion where the brightness difference between the images is greater than the threshold value is detected to be a defect. However, according to the present embodiment method, a reference region is obtained through calculation from at least one or multiple corresponding regions, such as regions 61, 62, 64, and 65, for example, in accordance with Equation 1.

The scope of the present invention includes even the following detection manner. With reference to the case shown in FIGS. 2A and 2B, as shown in Equation 1, a single reference pattern image is not created from, for example, an average value or the like, but one-to-one comparisons are performed in multiple regions between the regions 63 and 61, between regions 63 and 62, between . . . and . . . , and between the regions 63 and 65, for example, and then, all the comparison results are statistically processed to thereby perform defect detection.

Figure 13A:
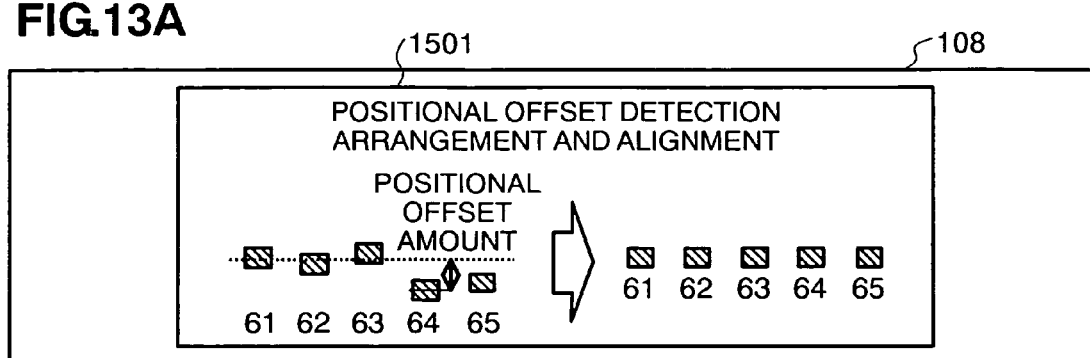
FIG. 13A is a diagram showing arrangement and alignment in a defect candidate extraction flow in an image comparison processing section.
Figure 13B:
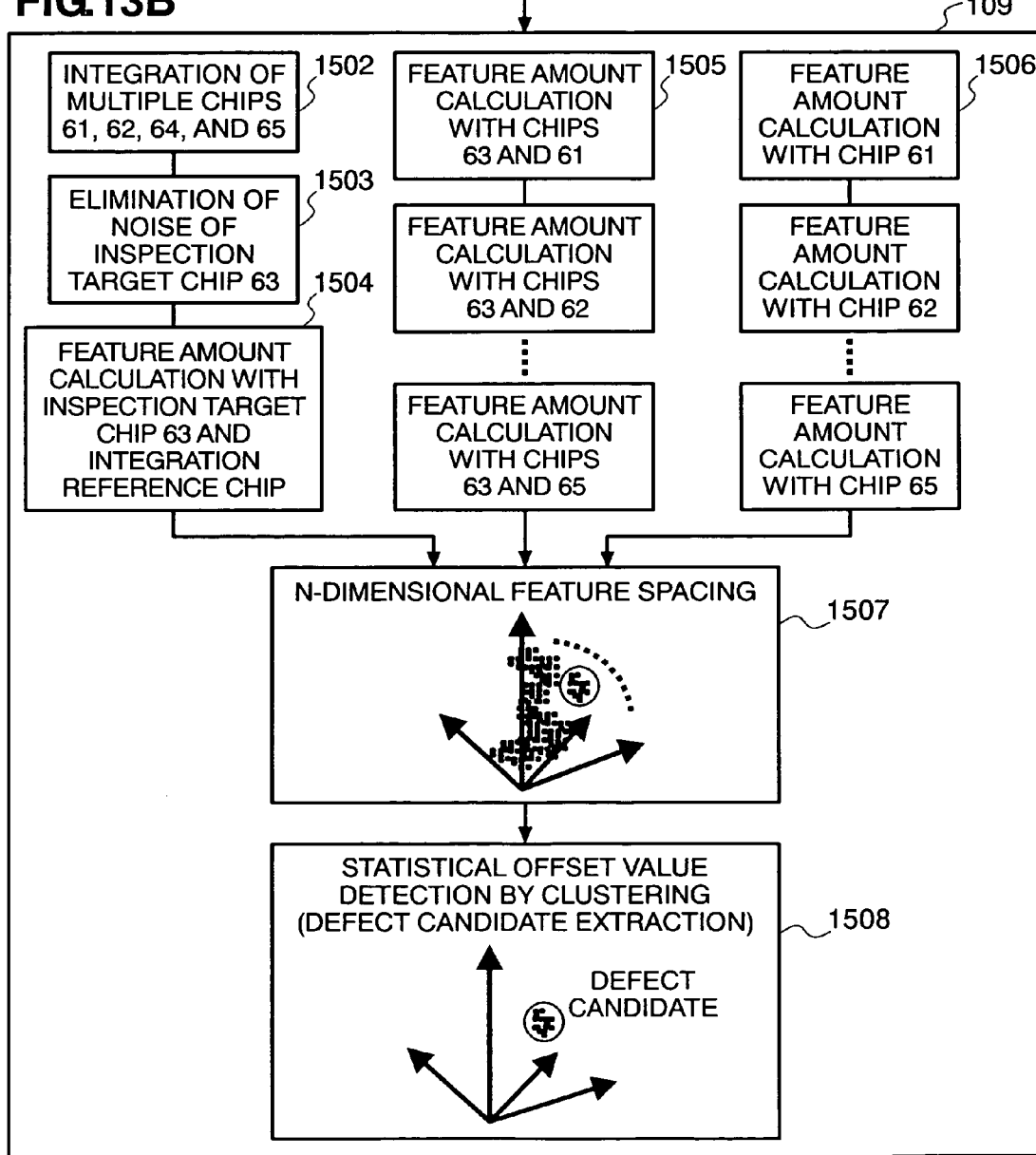
FIG. 13B is a diagram of the defect candidate extraction flow in the image comparison processing section.

FIGS. 13A and 13B show an example of the process that the image comparison processing section 15 executes by using multiple items of data as described above. Operation in the state of FIG. 11A is performed as follows. First, in synchronism with the movement of the stage, the data are input in series into the memory 107, and stored partial images of multiple chips (61 to 65 of FIG. 2A) are sequentially read out. Then, calculations are carries out to obtain the amounts of position shifts of corresponding regions for performing the comparison using the multiple regions in the position shift detecting section 108. Then, as shown in a portion 1501, positional alignment of the respective regions is carried out (arrangement and alignment). This is done for the reason that, because of, for example, vibration of the stage and tilt of a wafer set on the stage, corresponding chips do not generate signals at exactly the same position in the acquired images. For the calculations of the amounts of position shifts, various methods are available, such as methods using inter-image normalized correlations, sums of inter-image gray scale differences, and sums of inter-image squares, and any of such methods may be used.

Subsequently, as shown in FIG. 13B, a comparator section 109 detects a statistical offset value to be defect. In this case, the inspection target chip is assumed to be the chip 63. To begin with, as described above, the images 61, 62, 64, and 65 are integrated (at step 1502), and a reference image is created thereby. In this case, while the reference image can be compared with the image 63, noise from the image 63 can be removed. A method for the noise removal may be of the type simply using a Gaussian filter or a smoothing filter performing the moving averaging operation; or alternatively, may be of the type removing noise of specific frequencies by, for example, FET or wavelet processing (at step 1503). Then, an N feature amounts (N: integer greater than or equal to 1) are obtained from the integrated reference image, which has been created through synthesis, and the respective pixels of the image (detection image) of the inspection target chip, from which noise has been removed (at step 1504), thereby to form an N-order feature spacing (at step 1507).

Examples of the feature amounts include, but not limited to, brightness values of the respective detection image and reference image and an average brightness value of both images, contrast, standard deviation across neighboring pixels, brightness differential between the detection image and the reference image, increase and decrease with respect the neighboring pixel, quadratic differential value. Any other factors may be used inasmuch as they represent features of respective images. In addition, of the N feature spacings, spacings may be formed by selecting feature amounts effective for defect determination. Then, clustering is carried out over the feature spacings, and pixels falling in the statistically offset value are extracted to be defect candidates (at step 1508).

According to the present invention, without performing the synthesis of reference images from images of multiple chips, it is possible to compare respective reference image with an inspection target chip. More specifically, with respect to the inspection target chip 63, a feature amount calculation is performed from the chip 63 and respective pixels of the chip 61 (at step 1505). Similarly, calculations are sequentially performed to obtain feature amounts from the chips 63 and 62, the chips 63 and 65, and the chips 63 and 65, and the feature spacing is formed from the respective results of the calculations. Then, an offset value is determined to be a defect. Alternatively, the inter-chip comparisons are not performed, but the feature amounts are calculated using the respective images of the chips 61 to 65 (at step 1506) to form the feature spacing, whereby making it possible to determine a offset value to be a defect.

The threshold value for detecting offset values (for example, a distance from a normal pixel distribution for determining offset values in the feature spacing) is determined statistical data such as an average value or standard deviation in the brightness for forming the spacing).

The method, which uses the multiple items of data to detect a pixel falling within the statistical offset value, is adaptable as well to the cell comparison. Generally, in the case that a peripheral circuit portion and memory mat portions are mixed in a inspection target chip as shown in FIG. 2B, the chip comparison (dye comparison) is applied for the peripheral circuit portion, and the cell comparison is applied for the memory mat portions. In the present embodiment inspection, the images of the peripheral circuit portion and the memory mat portions are acquired with the same timing, the image detection with the stage movement is performed at one time, and the chip comparison and the cell comparison are performed in parallel. These can be accomplished in the manner that the image comparison processing section 15 is configured to include a chip-comparison dedicated image comparison processing circuit section and a cell-comparison dedicated image comparison processing circuit section, in which the chip comparison and the cell comparison are performed in the respective dedicated image comparison processing circuit sections. Consequently, the process times are the same in the cases that the inspection of the overall inspection target chips is performed by the chip comparison and the combination of the chip comparison and the cell comparison. An area for the cell comparison and an area for the chip comparison can either be manually input by a user while seeing an image of chips or be automatically specified with CAD (computer-aided design) data being input. The process may be arranged to allow the execution of parallel processing of cell comparisons and parallel processing of chip comparisons, in which the even higher speed image process can be implemented by combination of the parallel processings of the chip comparisons and the cell comparisons.

Figure 14A:
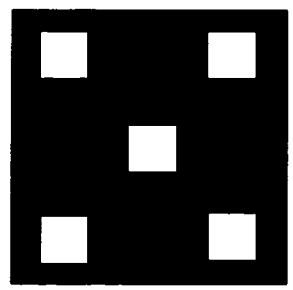
FIG. 14A is a diagram showing an example of high brightness variations across reference images.
Figure 14B:
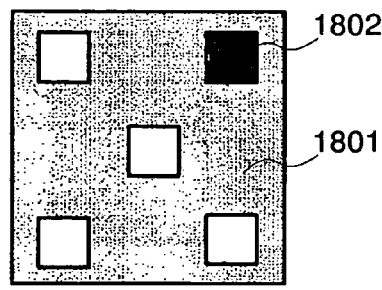
FIG. 14B is a diagram showing examples of high brightness variations and a defect across detection images.
Figure 14C:
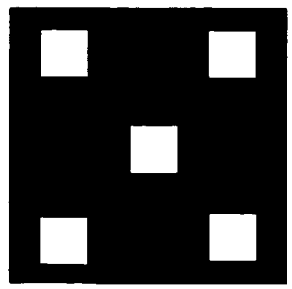
FIG. 14C is a diagram showing an example of high brightness variations across reference images.
Figure 14D:
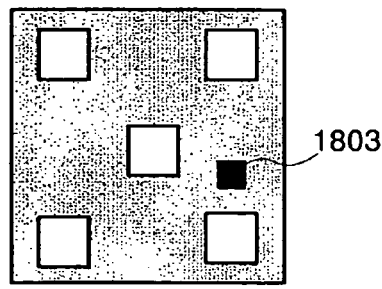
FIG. 14D is an example of high brightness variations across detection images including a defect.

According to such a simple method, however, while the statistically offset values within the partial image are thus extracted to be defect candidates, a non-defect (misreported matter) may probably be included in the inspection result. FIG. 14A is a reference image, and FIG. 14B is a detection image. In these cases, a significant brightness variation is caused in a background portion 1801. In addition, in a pattern 1802, a significant brightness variation is caused, and light/dark inversion is caused with respect to similar neighboring patterns. In an image of FIG. 14C, 14D, while pattern inversion is not caused, a defect 1803 is present. In such local images, a light/dark inverted pattern in FIG. 14B and a defect 1803 in FIG. 14D, respectively, are detected to be offset values. In these cases, there is a high probability that many inverted patterns similar to that described above have occurred in a neighboring region of the image of FIG. 14B. As such, according to the present embodiment method, offset values in such a local region are collected from a wider region, items of information of the offset values are integrated, and a final offset value is detected to be a defect.

Figure 15:
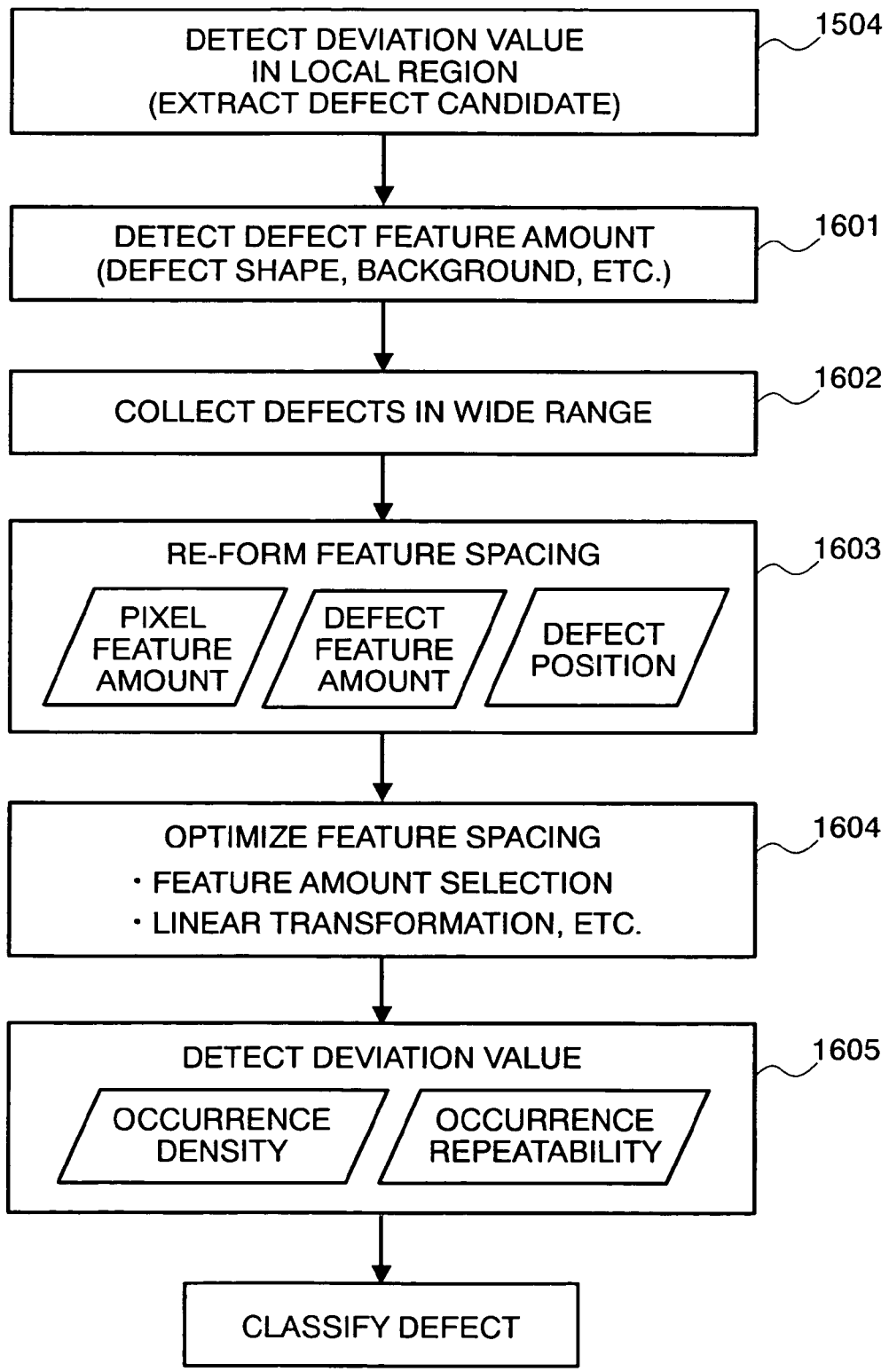
FIG. 15 is a diagram showing a flow of defect detection to be performed through offset value integration.

FIG. 15 shows an example of the process described above. To begin with, feature amounts are extracted from defect candidates extracted as offset values within a local region in one of the manners of the chip comparison (dye comparison), cell comparison, and the comparison by parallel combination of the chip comparison (dye comparison) and the cell comparison (at step 1601). In this step, in addition to per-pixel feature amounts, feature amounts of defects in, for example, the areas and shapes of the respective defects and background texture are calculated. These defect candidates are each extracted from a local region in a chip such as the portion 63 of FIG. 6.

Subsequently, defect candidates are collected from a wider region, such as one line of chips as shown in a portion 1701 of FIG. 11B, or from all chips in the wafer (at step 1602). Not only per-pixel feature amounts, but also factors such as feature amounts of defects, intra-wafer coordinates, and intra-chip coordinates are used as feature amounts, thereby to again form a feature spacing (at step 1603).

Then, at least one or multiple optimal feature amounts are selected corresponding to, for example, the process and type of the target wafer, and linear transformation or the like of the spacing is performed, whereby the feature spacing is optimized to facilitate the identification between defects and the misreported matters (at step 1604). Further, the occurrence density, repeatability, and the like within the chip are taken into account, and statistically offset values are detected (at step 1605). The offset values are recognized to be final defects, and are classified corresponding to the types of defects (at step 1606). Thereby, defects and misreported matters, of which identification is difficult, are identified with high accuracy.

In an example of an inspection apparatus using the present embodiment method, past inspection results are stored in the storage device 113, and defects and misreported matters can be identified with high accuracy by using the stored inspection results (portion 1702 of FIG. 11A). For example, when it is preliminarily known whether past inspection results are critical or non-critical defect in the subsequent inspection, the results are stored with defective images, feature amounts, and criticality/non-criticality information. The information as well is reflected into, for example, a threshold value and a determination rule for final defect detection and classification. Alternatively, the defect and misreported matter can be identified from one another by comparison of the feature amount of the detected defect with a feature amount of a defect detected in past inspection, of which the criticality/non-criticality is preliminarily known.

Figure 17A:
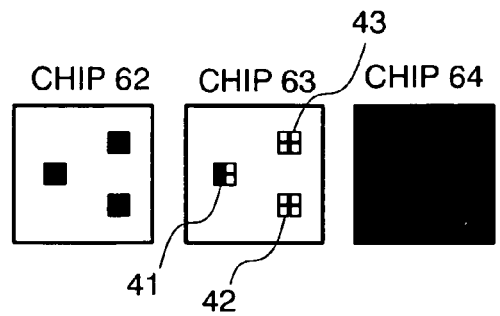
FIG. 17A is a view showing some of detection images of a inspection target chip and reference images in left and right corresponding portions.

Further, in the present embodiment method, in the case that a pattern prone to a defect is preliminarily known, the pattern can be detected with high sensitivity. With reference to FIG. 17A, numeral 63 denotes a detection image of a part of a inspection target chip, numerals 62 and 64 denote reference images of portions corresponding to the left and right chips. Essentially, numerals 41 to 43 of the chip 63 each denote four hole patterns arranged in the 2×2 form, which are supposed to be identical to one another. In the case of the hole pattern 41, of the four hole patterns, two left hole patterns are different in brightness on the image from the hole patterns 42 and 43 due to insufficient filling. In comparison, in the image 62 adjacent to the left side, the overall hole pattern is dark in comparison to the hole pattern of the image 63 due to brightness variations in association with the film thickness difference. For this reason, compared to the images 62 and 63, differences across all the hole patterns are increased, so that also the hole patterns 42 and 43 are detected to be defects. On the other hand, in the case of the image 64 adjacent to the right side, ambient brightness variations are caused on the base, so that compared to the images 63 and 64, the difference of the base is larger than the difference of the defect, therefore permitting overlooking of the defect. Thus, in the event that brightness variations are caused in the part between the comparison images, the influence thereof makes it difficult to detect only a real defect with high sensitivity.

In the comparison inspection according to the present invention, in the event that a pattern like the pattern 41 prone to a critical defect which is desired to be precisely inspected is preliminarily known, even when brightness variations are caused in various portions, the specific pattern can be inspected with high sensitivity without being influenced by the variations.

Figure 17B:
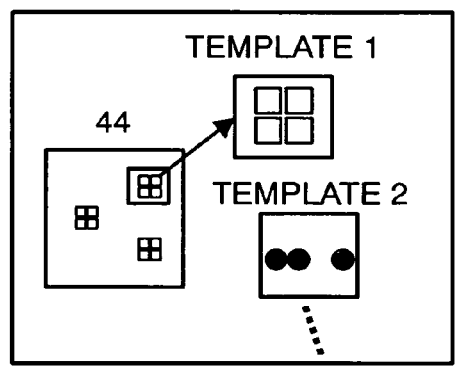
FIG. 17B is a view showing an example of setting specified patterns to be templates.
Figure 17C:
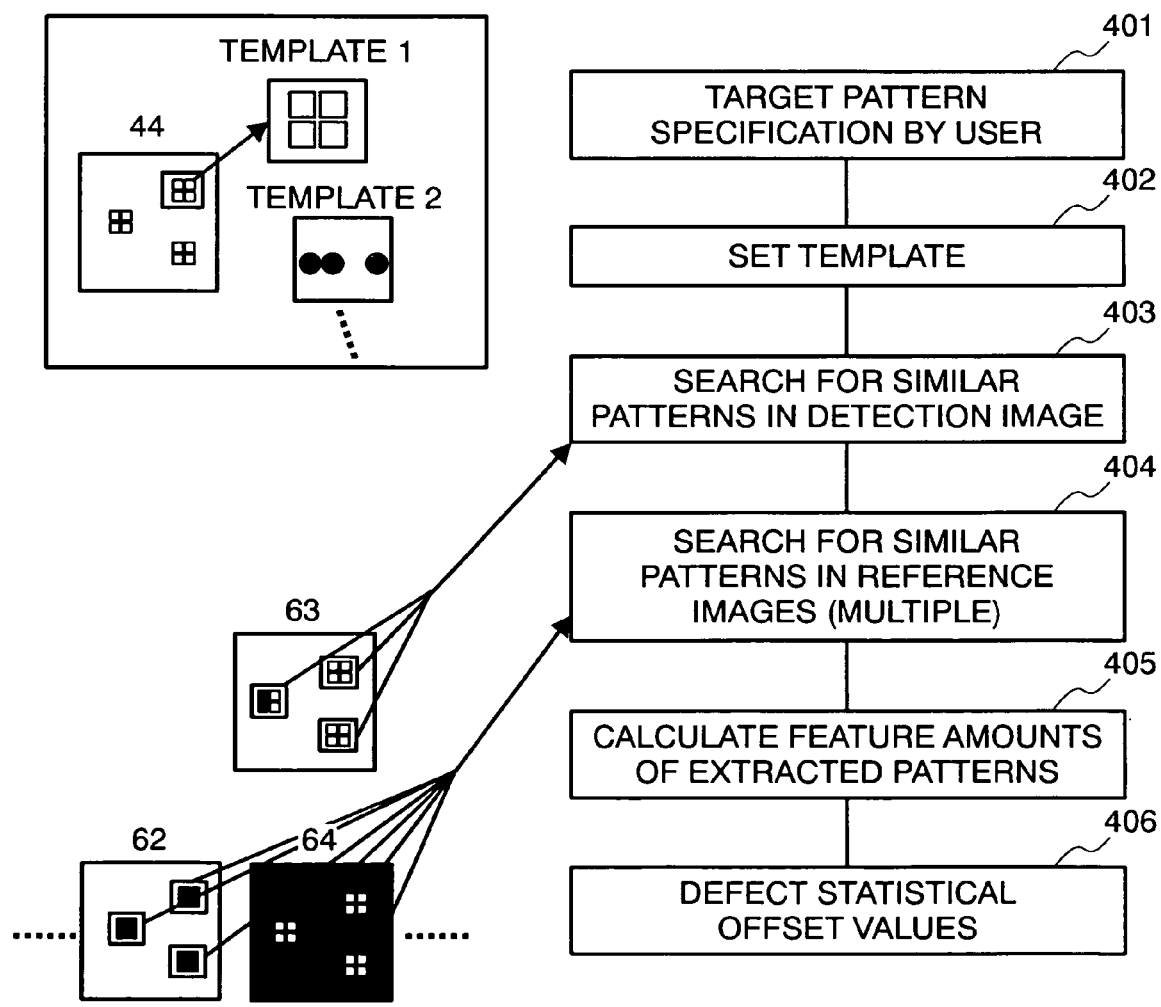
FIG. 17C is a diagram of a flow of high sensitivity inspection of a pattern when the pattern is preliminarily known as a pattern desired to be precisely inspected.

FIG. 17C shows a flow and a procedure of the aforementioned inspection. To begin with, a pattern specifically desired to be inspected with high sensitivity is specified by a user from detection images (at step 401). Numeral 44 of FIG. 17B is an example specified in a rectangular form. According to the present invention, a pattern thus specified is set to be a template and stored (at step 402). In this case, multiple templates may be set. When the inspection image is input, patterns similar to the template within a detection image (such as the image 63) is searched for by the image comparison processing section 15 (at step 403). Further, patterns similar to the template is searched for within images (such as the images 62, 64, . . . ) in corresponding positions of multiple peripheral chips (at step 404). Then, feature amounts of patterns searched for are calculated (at step 405). The feature amounts may be any factor that represents a feature of the multiple patterns, such as variances or contrast average val. Then, a statistical offset value is detected to be a defect (at step 406).

Thus, the offset value is detected from the feature amounts only of the same multiple patterns, whereby even when significant brightness variations occur in peripheral portions thereof, a defect desired by the user can be detected with high sensitivity without having the influence of the variations.

Further, in the comparison inspection according to the present invention, an item ("nuisance," hereafter) that would be detected as a defect but would not be critical in the defect condition can be excluded from inspection targets.

Figure 18:
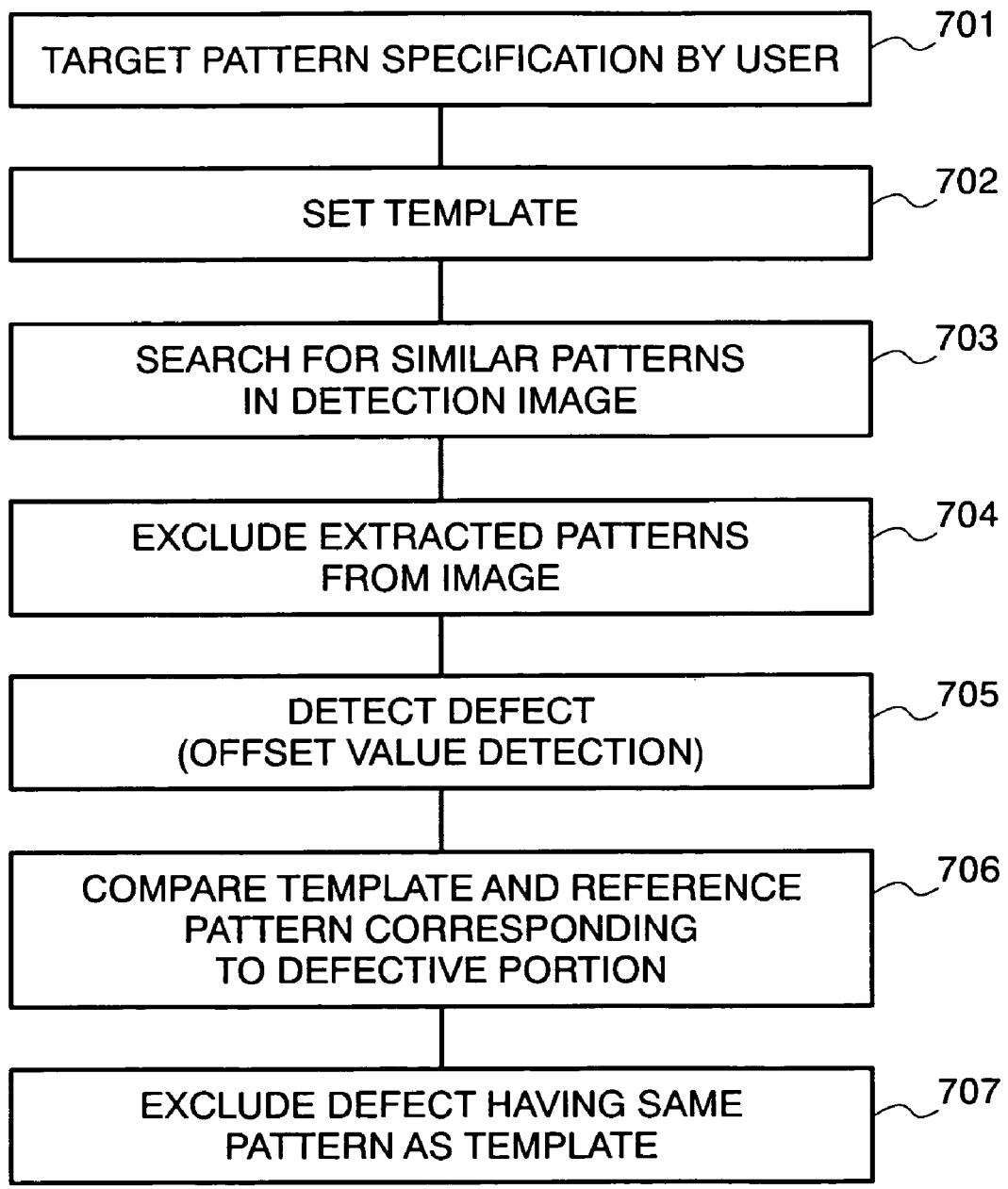
FIG. 18 is a flow diagram showing an example of an elimination procedure for a pattern prone to a nuisance defect.

FIG. 18 shows a flow of the aforementioned exclusion process, in which a procedure similar to that of FIG. 17 is carried out. To begin with, a pattern preliminarily known to be prone to a nuisance or nuisance defect is specified by a user from detection images (at step 701). According to the present invention, a pattern thus specified is set to be a template and stored (at step 702). In this case, multiple templates may be set. In the image comparison processing section 15, of an input image, an extracted pattern region is excluded (at step 704), and the defect detection process is performed (at step 705). Further, a reference image corresponding to a detected defect is compared with the template (at step 706). If they are the same pattern, then the defect is determined to be a nuisance defect and hence excluded (at step 707).

Thus, the nuisance is preliminarily excluded from the inspection target region, whereby the influence on detection of a critical defect is reduced so as to not detect such a nuisance defect.

Figure 19A:
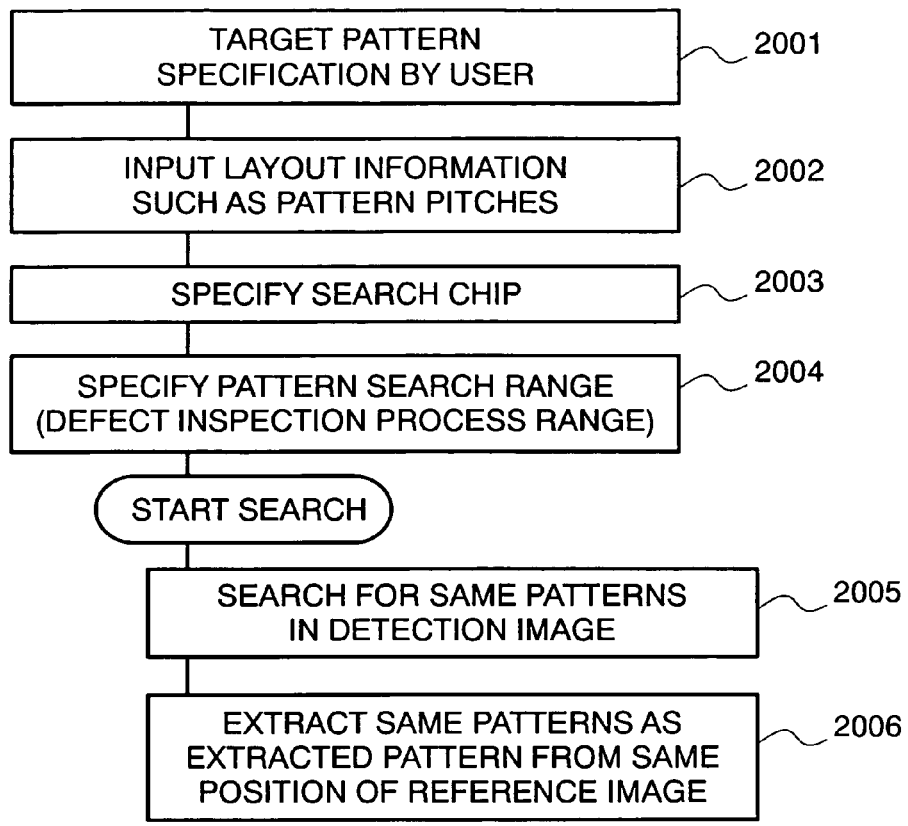
FIG. 19A is a flow diagram of a process in the event that a pattern similar to a set template is searched with high accuracy and high speed.
Figure 19B:
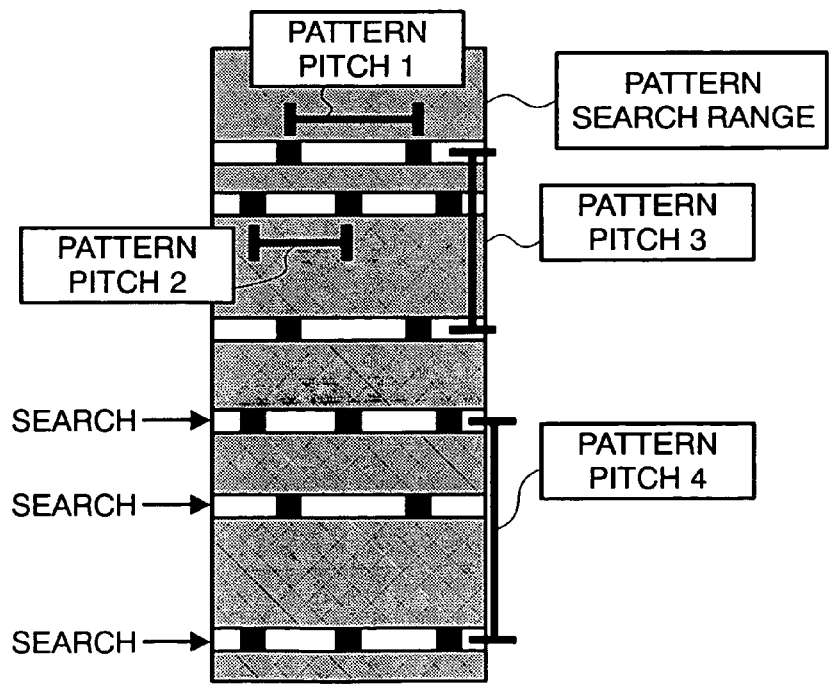
FIG. 19B is a view showing a pattern retrieval range.
Figure 19C:
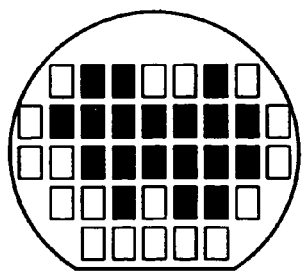
FIG. 19C is a wafer plan view showing a chip arrangement of an inspection target wafer.

FIGS. 19A to 19C show an example of performing high accuracy, high speed searching for a pattern similar to a set template. A case is now assumed such that it is preliminarily known that, as shown in FIG. 19A, repetitious patterns similar to a target pattern to be specified are present. In this case, after the target pattern is specified by a user (at step 2001), a repletion pitch of the patterns is input by the user as layout information (at step 2002). Thereby, the search region is restricted. Then, search chips are specified from a chip arrangement of an inspection target wafer, as shown in FIG. 19B (at step 2003). In addition, the search range in the image is specified, as shown in FIG. 19B (at step 2004). In searching, patterns similar to the template in the detection are first searched for; and when a target pattern has been detected, then searching is performed for a neighboring portion spaced away by the pattern pitch in a range set from the coordinates of the target pattern (at step 2005). Then, in an image of a set reference chip, a neighboring portion at the same coordinates as those of the previously extracted is searched, and patterns are extracted (at step 2006). In the case of CAD information, the layout information needs not to be input by the user, but the information can be input from the CAD information. In addition, when the pattern position specified from the past inspection information, pattern search can be performed by restricting the search range to peripheral portions of that position.

According to the present invention, the above-described high sensitivity inspection of a specified pattern can be performed concurrently with an inspection with a specified pattern being masked.

Figure 16A:
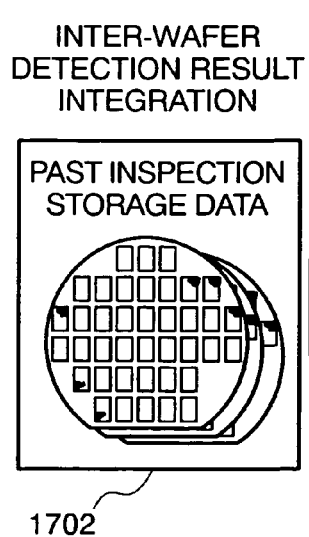
FIG. 16A is a diagram showing inspection data of multiple wafers.
Figure 16B:
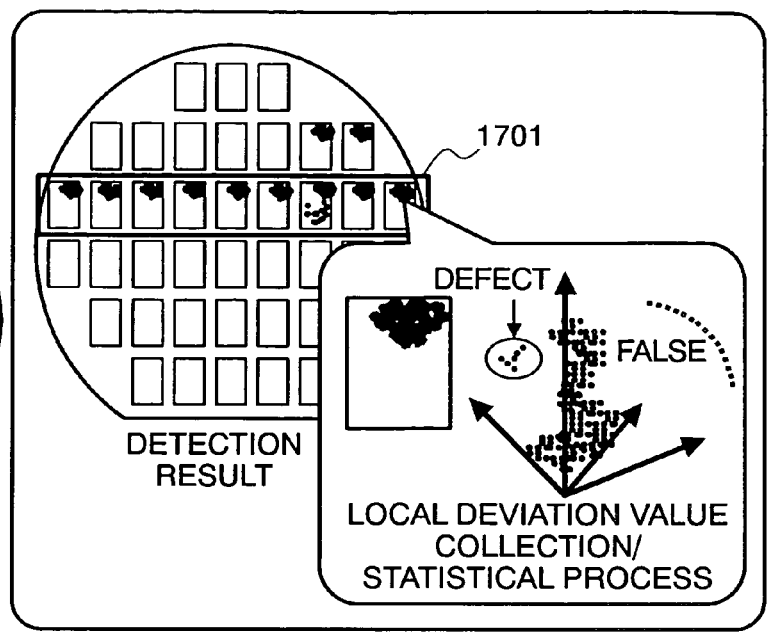
FIG. 16B shows a diagram illustrative of examples of offset value integration and multiple wafer information integration, and a plan view of a wafer illustrative of one line of defect candidates of chips.
Figure 20:
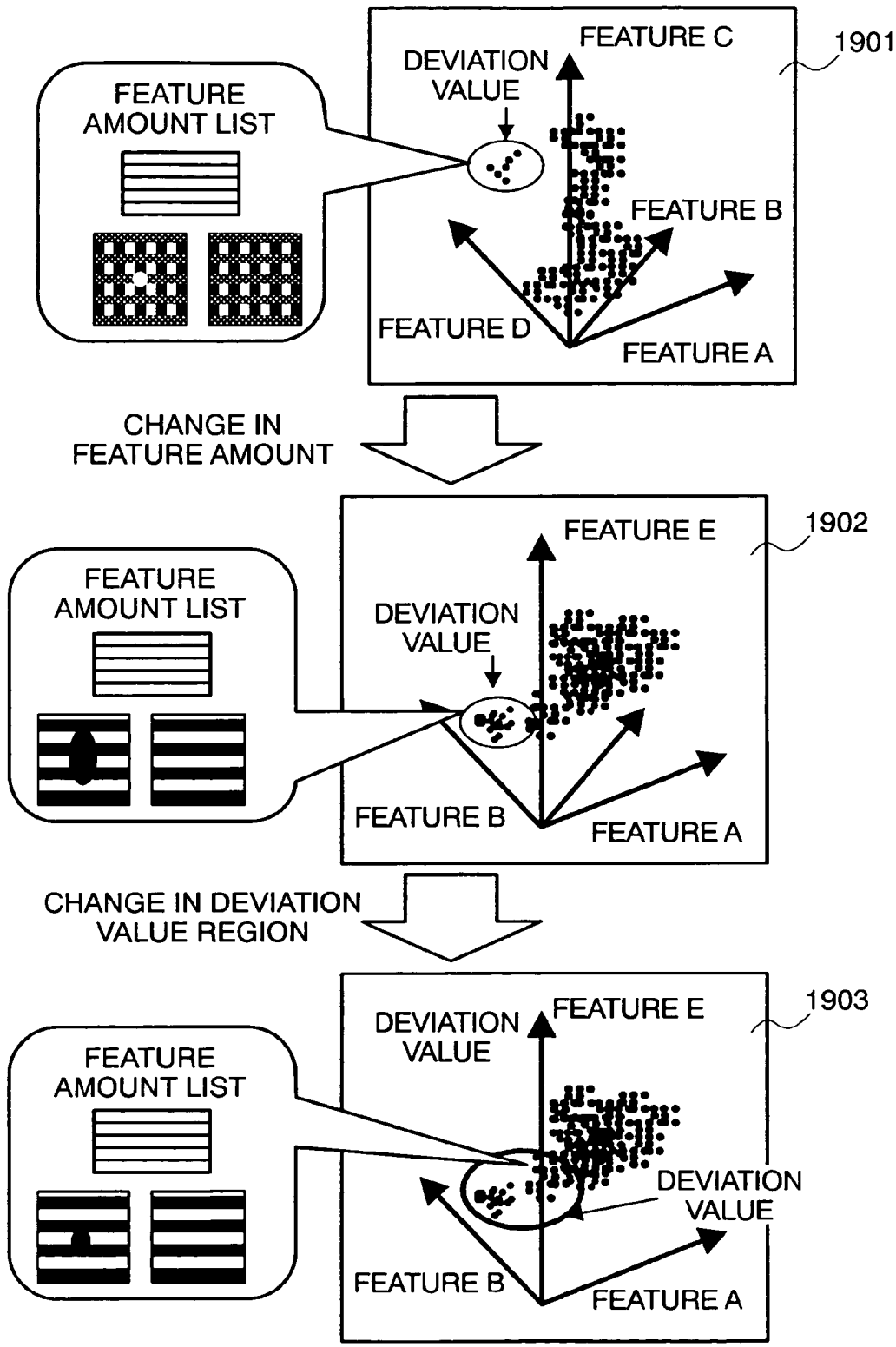
FIG. 20 is an example case of performing graphical display of, for example, an interim result and a detection result of inspection through statistical offset value detection on a GUI (graphical user interface).

The above is the flow of the defect detection and classification process according to the present invention, interim results, detection results, and the like are graphically displayed on the GUI 112 (user interface section). Examples of the displays are shown in FIG. 20. In many cases of conventional inspection, the results thereof are displayed in the form of a wafer map as shown in the portion 1701 of FIG. 16B. However, in the present embodiment method, an N-order feature spacing as shown in a portion 1901 of FIG. 20 is additionally displayed. When a point plotted in the spacing is specified, an image, a feature amount, and the like corresponding to the specified portion are displayed. After verification of these items of information, when an offset value is found to be a misreported value, a user is permitted to carry out, for example, adjustment or reselection for the feature amount. According to the present invention, as shown in a portion 1902, an offset value is again detected from stored feature amounts in response to the selection thereof, so that the user is able to instantly verify variations in the derivation thereof. Further, while verifying the offset value in the feature spacing, the user can concurrently tune the threshold value for final detection, as shown in a portion 1903. As described above, basically, in feature amount selection, the default value is initially used, and the result of defect and misreported matter detection is checked and concurrently tuned by the user. Alternatively, however, the selection may be carried in the manner that the user preliminarily presents teaching regarding the results of determination as to whether some defect candidates are defects or misreported matters, thereby enabling automatic selection of a feature amount so as to optimize the degree of separation of the defect candidates presented with the teaching to be highest.

The above-described process of the image comparison processing section 15 is accomplished through software processing by the CPU. However, arithmetic portions serving as cores for, for example, operation of normalized correlations and forming of feature spacings, may be included in hardware processing by an LSI or the like. Thereby, improvement of the processing speeds can be achieved. Further, the present invention enables the detection of defects in the range of from 20 nm to 90 nm even when there occur a delicate difference caused in the pattern film thickness after planarization processing such as CMP, and/or a significant brightness difference between dyes in association with a shortened wavelength of illumination light.

Further, suppose that the inspection is performed for low-k films, such as inorganic insulation films such as $SiO_2$, SiOF, BSG, SiOB, and porous ciliary films, and organic films such as methyl-group containing $SiO_2$, MSQ, polyimide based films, a parylene based film, a Teflon™base film, and an amorphous carbon film. In this case, according to the present invention, even when local brightness variations are present in association with intra-film variations in refraction index distribution, defects in the range of from 20 nm to 90 nm become detectable.

The one embodiment of the present invention has thus been described with reference to the exemplary case of the defect inspection method in the optical exterior inspection device for the semiconductor wafer used as the target. However, the present invention can be adapted for comparison images in electron beam pattern inspection. The inspection target is not limited to the semiconductor wafer, but the present invention is adaptable for other types of inspection targets, such as TFT substrates, photomasks, printed circuit boards.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for inspecting defects of patterns formed on a sample, the method comprising the steps of:
   storing multiple types of detection conditions for detecting optical images of the patterns;
   acquiring multiple detection images different from one another in the detection condition by detecting the optical images of the patterns under the stored multiple types of detection conditions, by using an optical inspection unit;
   extracting defect candidates by processing the acquired multiple detection images different from one another in the detection condition, by using a processor; and
   classifying the extracted defect candidates, by using a classifier;
   wherein in the step of extracting defect candidates, the multiple detection images different from one another in the detection condition are synthesized into a synthetic detection image, and defect candidates are extracted by comparing the synthetic detection image with a reference image.

2. A method for inspecting defects of patterns, according to claim 1, wherein:
   in the step of extracting defect candidates, defect candidates are extracted in units of an image different in the detection condition by sequentially processing the acquired multiple images for which the optical conditions different from one another; and
   in the step of classifying, classifying the defect candidates in units of the image different from one another in the detection condition.

3. A method for inspecting defects of patterns, according to claim 1, wherein the results of extraction and classification of the defect candidates are displayed on a screen discretely in units of the different detection condition, or are displayed on the screen by being integrated by obtaining one of a logical product or logical sum thereof in units of the different detection condition.

4. A method for inspecting defects of patterns, according to claim 1, wherein the detection conditions are different from one another in correspondence to the type of the sample, a pattern density, a pattern direction, and the type of a defect desired to be detected.

5. A method for inspecting defects of patterns, according to claim 1, wherein in the step of extracting defect candidates, the defect candidates are extracted by using statistical data.

6. A method for inspecting defects of patterns, according to claim 1, wherein the reference image is created by synthesizing a plurality of the multiple images.

7. A method for inspecting defects of patterns, according to claim 1, wherein:
   in the step of acquiring multiple detection images, the multiple detection images are acquired by sequentially detecting the optical images of patterns.

8. An apparatus for inspecting defects of patterns, the apparatus comprising:
   an imaging unit that images optical images of patterns formed on a sample;
   a storage unit that stores multiple types of detection conditions of the optical images for use by the imaging unit to image the optical images of the patterns;
   an image synthesizer unit that synthesizes multiple detection images different from one another in the detection condition into a synthetic detection image, the multiple detection images being acquired by detecting the optical images of patterns through the imaging unit by using the multiple types of detection conditions stored in the storage unit; and
   a defect candidate extraction and classification unit that (1) extracts defect candidates by comparing the synthetic detection image with a reference image, and that (2) classifies the defect candidates.

9. An apparatus for inspecting defects of patterns, according to claim 8, wherein the results of extraction and classification of the defect candidates by the defect candidate extraction and classification unit are displayed on a screen discretely in units of the different detection condition, or are displayed on the screen by being integrated by obtaining one of a logical product or logical sum thereof in units of the different detection condition.

10. An apparatus for inspecting defects of patterns, according to claim 8, wherein the defect candidate extraction and classification unit includes an optical condition selecting section that selects desired multiple detection conditions from the multiple types of detection conditions stored in the storage unit, whereby to extract and classify defect candidates in units of an image different from one another in the detection condition by sequentially processing the multiple images different from one another in the detection condition, which multiple images have been acquired by sequentially detecting the optical images of the patterns through the imaging unit by using the multiple detection conditions selected by the optical condition selecting section.

11. An apparatus for inspecting defects of patterns, according to claim 8, wherein the results of extraction and classification of the defect candidates by the defect candidate extraction and classification unit are displayed on a screen discretely in units of the different detection condition, or are displayed on the screen by being integrated by obtaining one of a logical product or logical sum thereof in units of the different detection condition.

12. An apparatus for inspecting defects of patterns, according to claim 8, wherein the defect candidate extraction and classification unit includes an optical condition selecting section that selects desired multiple detection conditions from the multiple types of detection conditions stored in the storage unit, whereby to extract and classify defect candidates in units of an image different from one another in the detection condition by sequentially processing the multiple images different from one another in the detection condition, which multiple images have been acquired by detecting the optical images of the patterns through the imaging unit by using the multiple detection conditions selected by the optical condition selecting section.

13. A method for inspecting defects of patterns, according to claim 8, wherein the reference image is created by synthesizing a plurality of the multiple images.

14. An apparatus for inspecting defects of patterns, according to claim 8, wherein the image synthesizer unit synthesizes the multiple detection images which are acquired by sequentially detecting the optical images of patterns through the imaging unit.

* * * * *